(12) United States Patent
Kageyama

(10) Patent No.: US 8,819,537 B2
(45) Date of Patent: Aug. 26, 2014

(54) INFORMATION GENERATION DEVICE, INFORMATION GENERATION METHOD, INFORMATION GENERATION PROGRAM, AND RECORDING MEDIUM

(75) Inventor: Hitoshi Kageyama, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 13/978,997

(22) PCT Filed: Sep. 27, 2011

(86) PCT No.: PCT/JP2011/071990
§ 371 (c)(1),
(2), (4) Date: Jul. 10, 2013

(87) PCT Pub. No.: WO2012/114571
PCT Pub. Date: Aug. 30, 2012

(65) Prior Publication Data
US 2013/0290865 A1 Oct. 31, 2013

(30) Foreign Application Priority Data
Feb. 22, 2011 (JP) ................................. 2011-036205

(51) Int. Cl.
*G06F 3/048* (2013.01)
(52) U.S. Cl.
USPC ........................... 715/206; 715/205; 715/234
(58) Field of Classification Search
USPC ......... 715/200, 201, 204, 234, 236, 239, 205, 715/206
See application file for complete search history.

(56) References Cited

U.S. PATENT DOCUMENTS

| | | | |
|---|---|---|---|
| 8,489,669 B2 * | 7/2013 | Johnson | 709/203 |
| 2001/0054064 A1 * | 12/2001 | Kannan | 709/203 |
| 2003/0154406 A1 * | 8/2003 | Honarvar et al. | 713/201 |
| 2006/0240851 A1 * | 10/2006 | Washburn | 455/466 |
| 2007/0038610 A1 * | 2/2007 | Omoigui | 707/3 |
| 2007/0244900 A1 * | 10/2007 | Hopkins et al. | 707/10 |
| 2007/0293200 A1 * | 12/2007 | Roundtree et al. | 455/414.1 |

(Continued)

FOREIGN PATENT DOCUMENTS

| | | |
|---|---|---|
| JP | 2006-127372 A | 5/2006 |
| JP | 2008-146455 A | 6/2008 |

(Continued)

OTHER PUBLICATIONS

International Search Report for PCT/JP2011/071990 dated Nov. 8, 2011.

*Primary Examiner* — Stephen Hong
*Assistant Examiner* — Gregory J Vaughn
(74) *Attorney, Agent, or Firm* — Sughrue Mion, PLLC

(57) ABSTRACT

An information generation device includes a storage means that stores association information, the association information indicating explanatory information and an element associated with the explanatory information in association with each other, the explanatory information being displayed as an explanation related to a service provided through a Web page in a certain Web page, a recording means that records history information indicating the explanatory information browsed by a user, a generation means that, on the basis of the association information, generates display information so that an appearance of the element associated with the explanatory information indicated by the recorded history information among the elements included in a Web page displayed on a terminal device used by the user is different from an appearance in an initial state, and a transmission means that transmits the generated display information to the terminal device.

14 Claims, 14 Drawing Sheets

(56) References Cited

U.S. PATENT DOCUMENTS

| | | | |
|---|---|---|---|
| 2008/0162498 A1* | 7/2008 | Omoigui | 707/10 |
| 2008/0189630 A1 | 8/2008 | Kondo et al. | |
| 2009/0100066 A1* | 4/2009 | McAfee | 707/10 |
| 2010/0070448 A1* | 3/2010 | Omoigui | 706/47 |
| 2010/0144380 A1* | 6/2010 | Washburn | 455/466 |

FOREIGN PATENT DOCUMENTS

| | | |
|---|---|---|
| JP | 2008-165693 A | 7/2008 |
| JP | 2009-9519 A | 1/2009 |
| JP | 2009-32028 A | 2/2009 |
| JP | 2010-92184 A | 4/2010 |

* cited by examiner

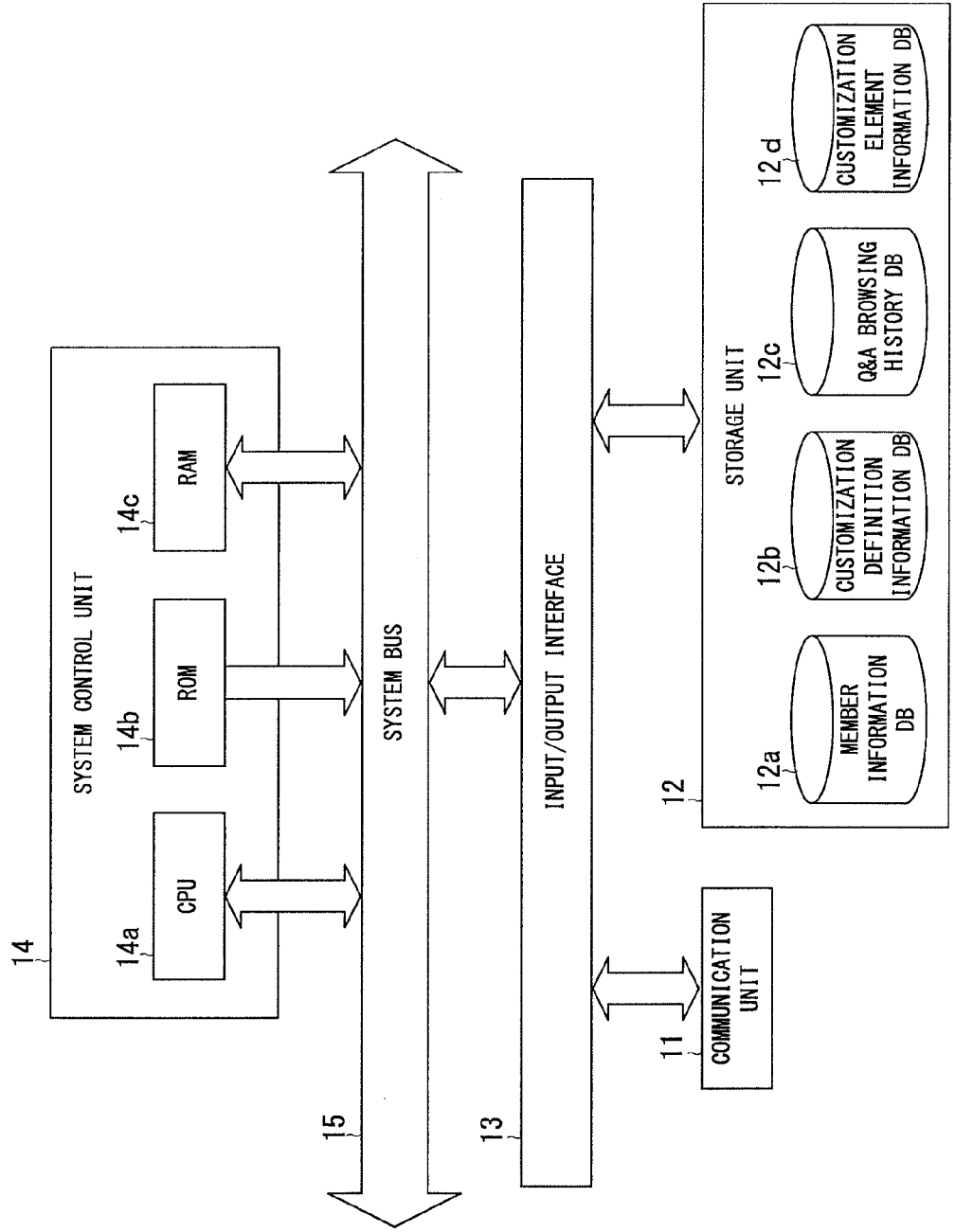

FIG.3A
MEMBER INFORMATION DB

| USER ID |
|---|
| PASSWORD |
| USER NAME |
| DATE OF BIRTH |
| GENDER |
| ADDRESS |
| PHONE NUMBER |
| EMAIL ADDRESS |
| . . . |

FIG.3B
CUSTOMIZATION DEFINITION INFORMATION DB

| Q&A-ID |
|---|
| DISPLAY ELEMENT ID |
| DEGREE OF INTER-DISPLAY-ELEMENT ASSOCIATION |

FIG.3C
Q&A BROWSING HISTORY DB

| USER ID |
|---|
| Q&A-ID |
| LATEST BROWSING DATE AND TIME |
| NUMBER OF BROWSING TIMES |

FIG.3D
CUSTOMIZATION ELEMENT INFORMATION DB

| USER ID |
|---|
| DISPLAY ELEMENT ID |
| NUMBER OF OPERATION TIMES |
| DEGREE OF CUSTOMIZATION |
| CUSTOMIZATION SIMULTANEOUS ENDING LIST |

FIG.5

CUSTOMIZATION DEFINITION INFORMATION DB

| Q&A-ID | Q&A | | DISPLAY ELEMENT NAME | DEGREE OF INTER-DISPLAY-ELEMENT ASSOCIATION |
|---|---|---|---|---|
| | CATEGORY | CONTENT OF QUESTION | | |
| 001 | DELIVERY | SHIPPING COST IS TOO EXPENSIVE | DELIVERY EXPLANATION LINK | — |
| 002 | SHOPPING CART | METHOD FOR CHECKING AN ITEM FOR SALE PUT IN SHOPPING CART | SHOPPING CART LINK SHOPPING CART INPUT BUTTON | STRONG |
| 003 | SHOPPING CART | EVEN THOUGH I ADD AN ITEM TO SHOPPING CART, "SOLD OUT" IS DISPLAYED | SHOPPING CART LINK SHOPPING CART INPUT BUTTON | STRONG |
| 004 | PURCHASE | I WANT TO BUY A PLURALITY OF ITEMS FOR SALE AT THE SAME TIME | SHOPPING CART INPUT BUTTON GROUP BUYING BUTTON | WEAK |
| 005 | PAYMENT | I WANT TO USE POINTS | PAYMENT METHOD EXPLANATION LINK | — |
| 006 | PAYMENT | ALTHOUGH I HAVE PAID FOR THE ITEM FOR SALE, THE ITEM FOR SALE HAS NOT BEEN DELIVERED YET | PAYMENT METHOD EXPLANATION LINK | — |
| 007 | RETURN | I WANT TO CANCEL AN ITEM FOR SALE | RETURN EXPLANATION LINK | — |
| ... | ... | ... | ... | ... |

INFORMATION GENERATION DEVICE, INFORMATION GENERATION METHOD, INFORMATION GENERATION PROGRAM, AND RECORDING MEDIUM

CROSS REFERENCE TO RELATED APPLICATIONS

This application is a National Stage of International Application No. PCT/JP2011/071990, filed on Sep. 27, 2011, which claims priority from Japanese Patent Application No. 2011-036205, filed on Feb. 22, 2011, the contents of all of which are incorporated herein by reference in their entirety.

TECHNICAL FIELD

The present invention relates to a technical field of an information generation device and an information generation method which generate display information used to display a Web page so that an appearance of an element included in a Web page is customized for each user.

BACKGROUND ART

Conventionally, a customization function by which an appearance of an element displayed in a Web page displayed on a terminal device can be set for each user is known. For example, in the customization function, a user sets an appearance of each element. By this setting, the user can change a user interface provided as a Web page into a user interface which is easy to use for the user. As a result, it is possible to customize a service provided to the user through a Web page to be easy to use.

Patent Literature 1 discloses a technique for effectively setting each function of a Web application. Specifically, a user who browses tutorial contents which introduce the functions of the Web application presses a predetermined button of a remote control while browsing the tutorial contents. Then, the Web server sets the functions introduced by the tutorial contents being browsed enable.

CITATION LIST

Patent Literature

Patent Literature 1: Japanese Patent Application Laid-Open No. 2010-92184

SUMMARY OF INVENTION

Technical Problem

However, to enable the functions of the Web application by using the technique described in Patent Literature 1, the user has to perform a setting operation to enable the functions. Therefore, there is a problem that the setting operation is troublesome for a user who is not used to such a setting operation.

The present invention is made in view of the above situation and an object of the present invention is to provide an information generation device, an information generation method, an information generation program, and a recording medium, which can generate display information used to display a Web page so that an appearance of an element included in the Web page is suitable for the user even when the user does not perform the setting operation.

Solution to Problem

In order to achieve the above object, an invention described in claim 1 is an information generation device that generates display information being used to display a Web page and indicating an appearance of an element included in the Web page, the information generation device comprising: a storage means that stores association information, the association information indicating explanatory information and the element associated with the explanatory information in association with each other, the explanatory information being displayed as an explanation related to a service provided through a Web page in a certain Web page; a recording means that records history information indicating the explanatory information browsed by a user; a generation means that, on the basis of the association information, generates the display information so that an appearance of the element associated with the explanatory information indicated by the recorded history information among the elements included in a Web page displayed on a terminal device used by the user is different from an appearance in an initial state; and a transmission means that transmits the generated display information to the terminal device.

According to this invention, the appearance of the element which is one of elements included in the Web page displayed on the terminal device and which is associated with the explanatory information browsed by the user is displayed differently from the appearance in the initial state. Therefore, it is easy for the user to find an element associated with the explanatory information browsed by the user. Therefore, even when the user does not perform a setting operation of the appearance, it is possible to set the appearance of the element included in the Web page to be suitable for the user.

An invention described in claim 2 is the information generation device according to claim 1, further comprising: a reception means that receives identification information of a user using a terminal device and identification information of the explanatory information included in a Web page transmitted to the terminal device from the terminal device, wherein the recording means associates the received identification information of the explanatory information and the received identification information of the user with each other and stores the identification information of the explanatory information and the identification information of the user as the history information in a history information storage means.

According to this invention, the history information that indicates what explanatory information each user has browsed is stored in a history information storage means. Therefore, an operator of the site can know how the site should be improved from the history information stored in the history information storage means.

An invention described in claim 3 is the information generation device according to claim 1 or 2, further comprising: an acquisition means that acquires number-of-times information indicating number of times that the element corresponding to the explanatory information is operated by a user after the explanatory information is browsed; and a first determination means that determines whether or not the number of times indicated by the acquired number-of-times information is greater than or equal to predetermined number of times, wherein the generation means generates the display information so that the appearance of the element for which the number of times indicated by the acquired number-of-times information is determined to be greater than or equal to the predetermined number of times is the appearance in the initial state.

According to this invention, when an element which the explanatory information associated with is browsed by the user and thereby the appearance is changed from the appearance in the initial state is operated a predetermined number of times or more, the appearance of the element returns to the appearance in the initial state. When the user operates an element several times and the user gets used to the operation of the element, the appearance of the element need not be left changed. Thus, it is possible to prevent the element from disturbing the user to find other elements.

An invention described in claim 4 is the information generation device according to claim 3, wherein the recording means records the history information including the identification information of the browsed explanatory information and time information indicating time when the explanatory information was browsed most recently, the acquisition means acquires the number-of-times information indicating the number of times that the element corresponding to the explanatory information is operated by a user after the explanatory information was browsed most recently, the information generation device further comprises a second determination means that determines whether or not a period of time of a predetermined length has elapsed from time indicated by the time information included in the recorded history information, and the generation means generates the display information so that the appearance of the element for which the number of times indicated by the acquired number-of-times information is determined to be greater than or equal to the predetermined number of times and the period of time of the predetermined length has elapsed from the time indicated by the time information included in the recorded history information is the appearance in the initial state.

According to this invention, when an element is operated a predetermined number of times or more after the associated explanatory information was browsed most recently by the user and the associated explanatory information is not browsed for a predetermined period of time, the appearance of the element returns to the appearance in the initial state. An appearance of an element which the user can operate even when the user does not browse the associated explanatory information for a certain period of time need not be left changed. Therefore, it is possible to reliably specify an element whose appearance need not be left changed.

An invention described in claim 5 is the information generation device according to any one of claims 1 to 4, wherein the storage means stores the association information indicating the element associated with each of a plurality of pieces of the explanatory information included in one Web page, the information generation device further comprises a first reception means that receives first identification information which is identification information of the explanatory information specified by a user to be displayed from a terminal device, a second reception means that receives second identification information from the terminal device, the second identification information being identification information of the explanatory information displayed by the terminal device along with the explanatory information specified by a user to be displayed when a Web page is displayed by the terminal device, and a second recording means that records difference information indicating a difference between the appearance of each element associated with the explanatory information identified by either of the received first identification information and the received second identification information and the appearance in the initial state, the second recording means making the difference of the display element associated with the explanatory information identified by the first identification information higher than the difference of the display element associated with the explanatory information identified by the second identification information, and the recording means records the received first identification information and the received second identification information as the history information, and the generation means generates the display information so that the higher the difference indicated by the difference information, the higher the difference of the appearance of the element from the appearance in the initial state.

According to this invention, when a plurality of pieces of explanatory information are displayed by the terminal device, appearances of elements associated with respective pieces of explanatory information are changed from the appearances in the initial state. At this time, regarding the displayed pieces of explanatory information, the appearance of an element associated with explanatory information specified by the user to be displayed is more different from the appearance in the initial state than the appearance of an element associated with explanatory information that is not specified by the user to be displayed. As a result, it is easier for the user to find an element associated with explanatory information which the user probably browses among the pieces of explanatory information displayed by the terminal device. Therefore, it is possible to change the appearance of an element associated with explanatory information that may be browsed by the user from the appearance in the initial state, as well as to change the appearances to appearances according to the probability that the explanatory information is browsed.

An invention described in claim 6 is the information generation device according to claim 3 or 4, wherein the storage means stores the association information indicating that a plurality of the elements are associated with one piece of the explanatory information, the association information including element association information indicating strength of association among a plurality of the elements, the generation means generates the display information so that the appearances of all the elements associated with the explanatory information indicated by the recorded history information are different from the appearances in the initial state, the information generation device further comprises a third determination means that determines whether the element association information corresponding to the plurality of elements indicates strong or weak when it is determined that the number of times that one of the plurality of elements is operated is greater than or equal to the predetermined number of times, and the generation means generates the display information so that the appearances of the plurality of elements are the appearances in the initial state when it is determined that the element association information indicates that the association is strong and generates the display information so that only the appearance of the element for which the number of times indicated by the number-of-times information is determined to be greater than or equal to the predetermined number of times is the appearance in the initial state when it is determined that the element association information indicates that the association is weak.

According to this invention, when a plurality of elements are associated with certain explanatory information, if the explanatory information is browsed, the appearances of the plurality of elements associated with the explanatory information are changed from the appearances in the initial state. Thereafter, it is assumed that the user operates one of the plurality of elements associated with the explanatory information a predetermined number of times or more. Then, when the association among the elements is strong, the appearances of all of the plurality of elements return to the appearances in the initial state, and when the association among the elements is weak, the appearance of only the element that are operated a predetermined number of times or more return to the appearance in the initial state. In other words, the appearance of an element that is strongly associated with an element whose appearance is determined to be not necessary to be left changed return to the appearance in the initial state. Therefore, it is possible to appropriately set appearances of a plurality of elements associated with one piece of explanatory information.

An invention described in claim 7 is an information generation method of an information generation device that generates display information which is used to display a Web page and which indicates an appearance of an element included in the Web page, the information generation method comprising: a recording step of recording history information indicating explanatory information displayed as an explanation related to a service provided through a Web page in a certain Web page, the explanatory information having been browsed by a user; a generation step of, on the basis of association information stored in a storage means storing the association information indicating the explanatory information and the element associated with the explanatory information in association with each other, generating the display information so that an appearance of the element associated with the explanatory information indicated by the recorded history information among the elements included in a Web page displayed on a terminal device used by the user is different from an appearance in an initial state; and a transmission step of transmitting the generated display information to the terminal device.

An invention described in claim 8 is an information generation program that causes a computer, which is included in an information generation device that generates display information being used to display a Web page and indicating an appearance of an element included in the Web page, to function as: a recording means that records history information indicating explanatory information displayed as an explanation related to a service provided through a Web page in a certain Web page, the explanatory information having been browsed by a user; a generation means that, on the basis of association information stored in a storage means storing the association information indicating the explanatory information and the element associated with the explanatory information in association with each other, generates the display information so that an appearance of the element associated with the explanatory information indicated by the recorded history information among the elements included in a Web page displayed on a terminal device used by the user is different from an appearance in an initial state; and a transmission means that transmits the generated display information to the terminal device.

An invention described in claim 9 is a recording medium in which an information generation program is computer-readably recorded, the information generation program causing a computer, which is included in an information generation device that generates display information being used to display a Web page and indicating an appearance of an element included in the Web page, to function as: a recording means that records history information indicating explanatory information displayed as an explanation related to a service provided through a Web page in a certain Web page, the explanatory information having been browsed by a user; a generation means that, on the basis of association information stored in a storage means storing the association information indicating the explanatory information and the element associated with the explanatory information in association with each other, generates the display information so that an appearance of the element associated with the explanatory information indicated by the recorded history information among the elements included in a Web page displayed on a terminal device used by the user is different from an appearance in an initial state; and a transmission means that transmits the generated display information to the terminal device.

Advantageous Effects of Invention

According to the present invention, the appearance of the element which is one of elements included in the Web page displayed on the terminal device and which is associated with the explanatory information browsed by the user is displayed differently from the appearance in the initial state. Therefore, it is easy for the user to find an element associated with the explanatory information browsed by the user. Therefore, even when the user does not perform a setting operation of the appearance, it is possible to set the appearance of the element included in the Web page to be suitable for the user.

BRIEF DESCRIPTION OF DRAWINGS

FIG. 2 is a block diagram showing an example of a schematic configuration of a service providing server 1 according to an embodiment.

FIG. 3A is a diagram showing an example of content registered in a member information DB 12a according to an embodiment. FIG. 3B is a diagram showing an example of content registered in a customization definition information DB 12b according to an embodiment. FIG. 3C is a diagram showing an example of content registered in a Q&A browsing history DB 12c according to an embodiment. FIG. 3D is a diagram showing an example of content registered in a customization element information DB 12d according to an embodiment.

FIG. 5 is a diagram showing a specific example of content registered in the customization definition information DB 12b according to an embodiment.

DESCRIPTION OF EMBODIMENT

Hereinafter, an embodiment of the present invention will be described in detail with reference to the drawings. The embodiment described below is an embodiment where the present invention is applied to a service providing system.

1. Schematic Configuration and Function of Service Providing System

Figure 1:
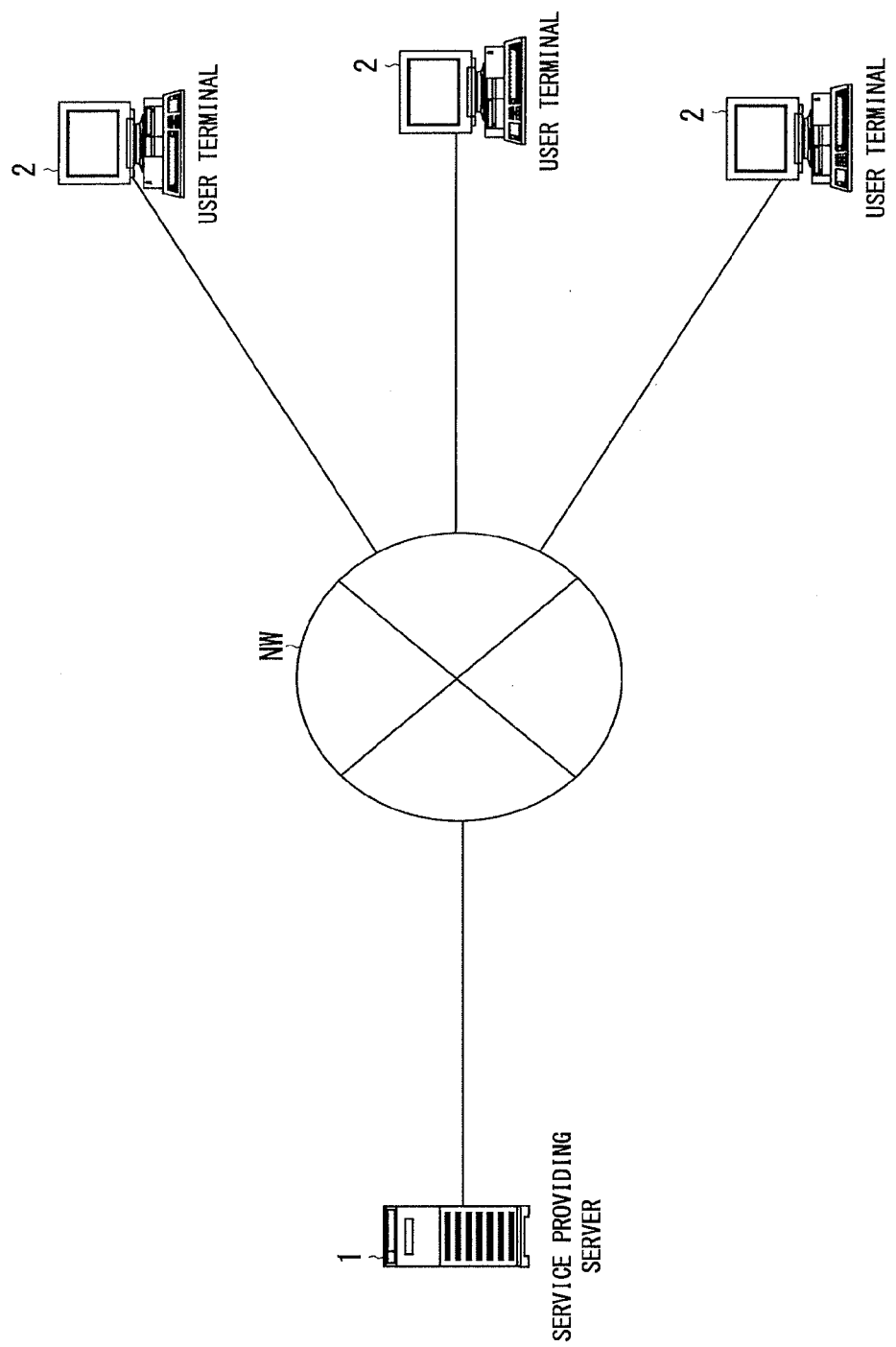
FIG. 1 is a diagram showing an example of a schematic configuration of a service providing system S according to an embodiment.

First, a schematic configuration and function of a service providing system S according to the embodiment will be described with reference to FIG. 1. FIG. 1 is a diagram showing an example of a schematic configuration of the service providing system S according to the embodiment.

As shown in FIG. 1, the service providing system S includes a service providing server 1 (an example of an information generation device of the present invention) and a plurality of user terminals 2 (an example of terminal devices of the present invention). The service providing server 1 and each user terminal 2 can transmit and receive data to and from each other through a network NW by using, for example, TCP/IP as a communication protocol. The network NW includes, for example, the Internet, a dedicated communication line (for example, a CATV (Community Antenna Television) line), a mobile communication network (including a base station and the like), and a gateway.

The service providing server 1 is a server device that performs various processes related to various sites belonging to a general site that provides general services. Examples of the sites belonging to a general site include a portal site, a search engine, a news site, an online shopping mall, an auction site, an Internet supermarket site, a reservation site of an accommodation facility and a recruitment site. For example, the service providing server 1 transmits Web pages of various sites according to a request from the user terminal 2 and performs a process according to the request.

The user terminal 2 is a terminal device of a user who uses various sites belonging to a general site. The user terminal 2 accesses the service providing server 1 or the like on the basis of an operation from a user. Thereby, the user terminal 2 receives a Web page from a server accessed by the user terminal 2 and displays the Web page. The user can use a service according to the accessed site through the Web page displayed on a screen of the user terminal 2. In the user terminal 2, software such as a browser and an email client is installed. For example, a personal computer, a PDA (Personal Digital Assistant), a mobile information terminal such as a smartphone, and a mobile phone are used as the user terminal 2.

In the service providing system S having the configuration as described above, the service providing server 1 customizes the display of the Web page transmitted to the user terminal 2. To customize the display of the Web page is to set appearances of display elements included in the Web page for each user. Each site belonging to a general site includes various types of Web pages. Each Web page includes one or more display elements. The display elements included in a Web page are elements displayed in the Web page. Examples of the display element include a text, a still image, a moving image, an electronic document, a table, a link, a button, an icon, an input field, a slide bar, a check box, and a list box.

In the service providing system S, a user need not perform the setting operation of the appearances of the display elements. The service providing server 1 automatically sets the appearances on the basis of a browsing history of Q&A (an example of explanatory information of the present invention) of the user of each site. The Q&A of a site is information of questions and answers about services provided through a Web page of the site. Information of answers included in the Q&A is an example of explanatory information indicating explanation about the services. Each site includes a Q&A page. The Q&A page is a Web page in which Q&A of the site is displayed.

The appearances of display elements in an initial state (by default) are the same for every user. Here, it is assumed that a certain user browses a certain Q&A. Then, the appearance of display element related to content of the Q&A is changed from the appearance in the initial state. The appearance is changed to an appearance which is more easily found by the user than the appearance in the initial state. Examples of the method for changing the appearance includes, enlarging a display size of a display element, blinking a display element, thickening a text of a display element, changing a style of a text of a display element, adding a speech balloon to a display element displaying the balloon (for example, a text "Here it is!" is displayed in the balloon), and thickening a frame line surrounding a display element.

When a user has a question about a service to be provided or has a matter to be checked, the user browses the Q&A. When the user browses a certain Q&A, it is guessed that the user probably intends to use a site in a way corresponding to content of the Q&A. Therefore, when the site is used in the way corresponding to the content of the browsed Q&A, it is easy to find a display element that may be seen by the user and a display element that may be operated by the user. The display element is easily found, so that it is possible to make the display element easy to be operated. Thereby, convenience for a user who is not used to using a site in a specific way is improved.

When a user refers to a certain Q&A, the appearance of a display element related to the Q&A is changed. Thereafter, if the user operates the display element a certain number of times or more and a predetermined time or period has passed after the user browsed the Q&A most recently, the appearance of the display element returns to the initial state. In this case, it is guessed that even if the user does not browse the Q&A for a certain period of time, the user operates the display element related to the Q&A and can use the site in the way corresponding to the content of the Q&A. In other words, it is guessed that the user gets used to the operation when the user uses the site according to the content of the Q&A. Therefore, it is not necessary to leave the appearance changed. If the appearance is left changed, there may be a case in which many appearances of display elements are being changed in one Web page. In this case, it is difficult for a user to find a display element of which an operation the user is not used to. Therefore, an appearance of a display element whose appearance need not be left changed returns to the appearance in the initial state.

2. Configuration of Service Providing Server

Next, a configuration of the service providing server 1 will be described with reference to FIGS. 2 to 7.

FIG. 2 is a block diagram showing an example of a schematic configuration of the service providing server 1 according to the embodiment. As shown in FIG. 2, the service providing server 1 includes a communication unit 11, a storage unit 12, an input/output interface 13, and a system control unit 14. The system control unit 14 and the input/output interface 13 are connected through a system bus 15.

The communication unit 11 connects to the network NW and controls communication state with the user terminal 2 and the like.

The storage unit 12 (an example of a storage means and a history information storage means of the present invention) includes, for example, a hard disk drive and the like. In the storage unit 12, a member information DB (database) 12a, a customization definition information DB 12b, a Q&A browsing history DB 12c, a customization element information DB 12d, and the like are constructed.

FIG. 3A is a diagram showing an example of content registered in the member information DB 12a according to the embodiment. In the member information DB 12a, member information related to users registered as a member in the general site is registered. Specifically, in the member information DB 12a, a user ID which is identification information of the user, a password, a user name, a date of birth, a gender, an address, a phone number, an email address, and the like are registered in association with each user.

FIG. 3B is a diagram showing an example of content registered in the customization definition information DB 12b according to the embodiment. In the customization definition information DB 12b, customization definition information indicating association between Q&A displayed in the Q&A page and a display element whose appearance is to be customized is registered. Specifically, in the customization definition information DB 12b, a definition record (an example of association information of the present invention) that stores a Q&A-ID, a display element ID, and a degree of inter-display-element association (element association information of the present invention) is registered for each Q&A. For example, these pieces of information are set by a system administrator.

The Q&A-ID is identification information of Q&A. The display element ID is identification information of a display element to be customized. For example, the system administrator sets a display element ID of a display element associated with Q&A indicated by the Q&A-ID. The display element associated with Q&A is, for example, a display element seen by a user and a display element operated by a user when the user uses a site in a way corresponding to content indicated by the Q&A. A plurality of display element IDs may be registered in one definition record. In other words, if the user browses a certain Q&A, appearances of a plurality of display elements may be changed.

The degree of inter-display-element association is stored when a plurality of display element IDs are stored in a definition record. The degree of inter-display-element association is information that indicates the strength of association between the display elements indicated by the plurality of display element IDs. When the association between a plurality of display elements is strong, the degree of inter-display-element association is set to "strong". When the association between a plurality of display elements is weak, the degree of inter-display-element association is set to "weak". When one of a plurality of display elements whose appearances are changed is operated, the appearance of the operated display element returns to the appearance in the initial state. At this time, the degree of inter-display-element association is used to determine whether or not to return the appearances of the other display elements to the appearances in the initial state.

For example, it is assumed that results when each display element to be customized corresponding to Q&A is operated are similar to each other. In this case, the degree of inter-display-element association is set to "strong". When the appearance of one of the display elements whose inter-display-element association is set to "strong" returns to the initial state, the other appearances also return to the initial state. For example, it is assumed that there is a plurality of usage ways of a site corresponding to content of Q&A. Further, it is assumed that each display element to be customized corresponding to the Q&A is operated in usage ways different from each other. In this case, the degree of inter-display-element association is set to "weak". When the appearance of one of the display elements whose inter-display-element association is set to "weak" returns to the initial state, the other appearances do not return to the initial state. When there is a plurality of usage ways corresponding to content of Q&A browsed by the user, the user may get used to a certain usage form, but the user may not get used to another usage form. Therefore, considering such a case, the timing when the appearances of a plurality of display elements whose inter-display-element association is set to "weak" return to the initial state is controlled individually.

Information indicating content of change when the appearance is changed may be stored in association with the display element ID stored in the definition record. It is possible to set the content of change of the appearance for each display element by the information.

Figure 4:
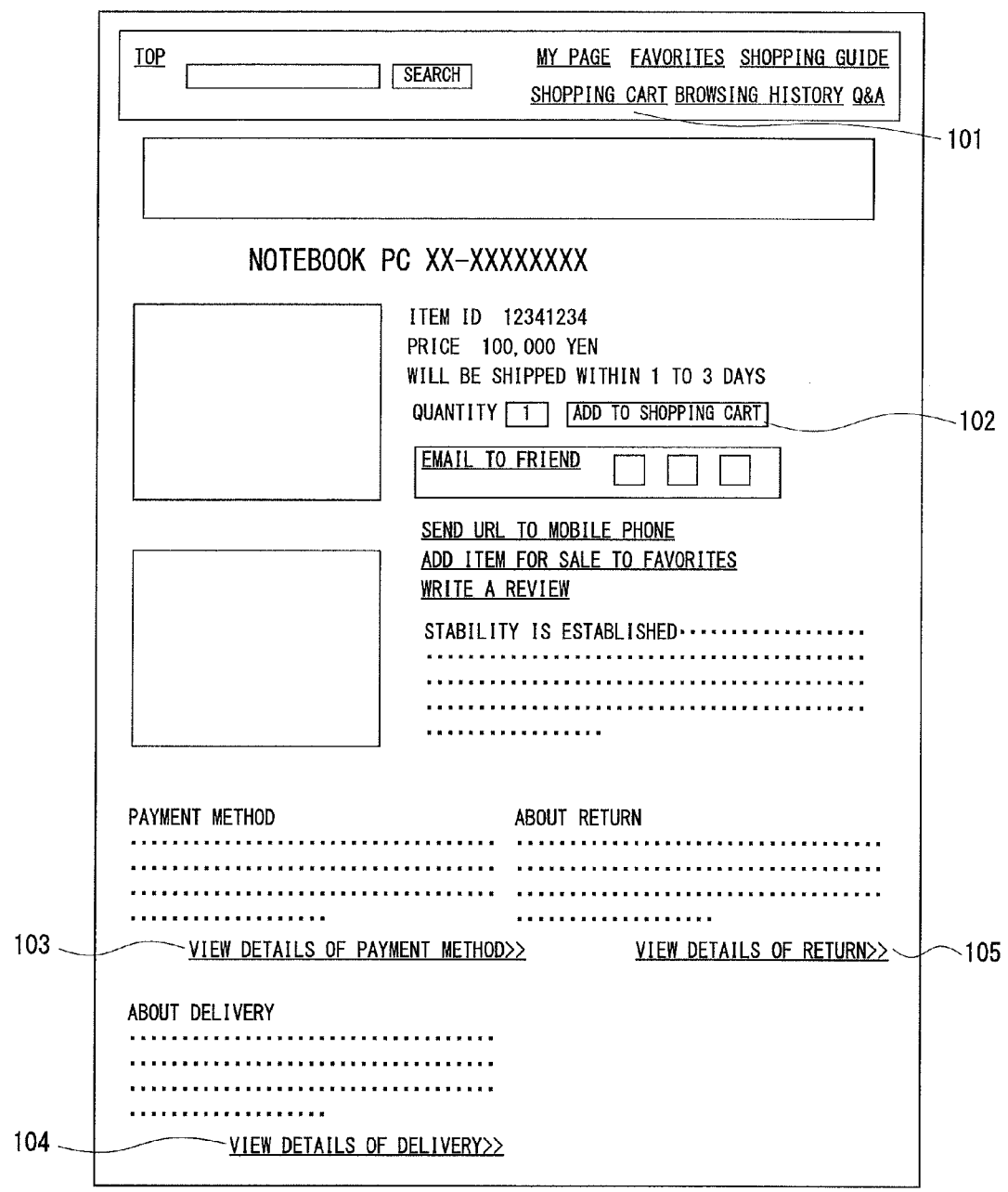
FIG. 4 is a diagram showing a display example of an initial state of a certain item for sale page in an online shopping mall.

Here, a specific example of content registered in the customization definition information DB 12b will be described. Here, Q&A in the online shopping mall will be described as an example. FIG. 4 is a diagram showing a display example of an initial state of a certain item for sale page in the online shopping mall. All the appearances of each display element included in the item for sale page shown in FIG. 4 are appearances in the initial state.

The item for sale page is a Web page on which information of one of items for sale that can be purchased in the online shopping mall is displayed. There is an item for sale page for each item for sale. In the item for sale page, an item-for-sale name, a price of the item for sale, an explanation of the item for sale, an image of the item for sale, an image representing an advertisement of a shop that sells the item for sale, a brief explanation of a method for paying purchase money, a brief explanation of delivery of the item for sale, a brief explanation of return of the item for sale, and the like are displayed. These pieces of information are also the display elements included in the Web page.

Also in the item for sale page, display elements that can be operated, such as a link, a button, an icon, and an input field, are displayed. When these display elements are selected, a Web page different from the item for sale page, which is currently displayed, may be displayed or a corresponding process may be performed by the service providing server 1. Examples of the display elements that can be operated include a shopping cart link 101, a shopping cart input button 102, a payment method explanation link 103, a delivery explanation link 104, and a return explanation link 105.

When the shopping cart link 101 is selected, a shopping cart page is displayed on the screen. The shopping cart is a virtual container, in which items for sale selected by the user as candidates to be purchased are inputted, in the online shopping mall. The shopping cart page is a Web page in which a list of the items for sale inputted in the shopping cart by the user is displayed. When the user selects a button to proceeds to a purchase procedure in the shopping cart page, the user can perform the purchase procedure of the items for sale displayed as a list. When the shopping cart input button 102 is selected, the item for sale whose information is displayed in the item for sale page is inputted in the shopping cart and then the shopping cart page is displayed on the screen. When the payment method explanation link 103 is selected, a Web page in which a detailed explanation of the method for paying the purchase money is displayed on the screen. When the delivery explanation link 104 is selected, a Web page in which a detailed explanation of the delivery of the item for sale is displayed is displayed on the screen. When the return explanation link 105 is selected, a Web page in which a detailed explanation of the return of the item for sale is displayed is displayed on the screen.

Each shop that is open in the online shopping mall can freely determine design and layout and the like of the Web page of each item for sale to be sold to some extent. Therefore, display positions of the display elements that can be operated may be different for each item for sale page. Further, the display elements that can be operated may be concentrated to a certain position in the item for sale page and displayed. As a result, it may be difficult for the user to find a display element to be operated. Therefore, predetermined display elements of the display elements included in the item for sale page are set to display elements whose appearances will be customized. The Web page in which the appearances of the display elements will be customized is not limited to the item for sale page. The site in which the appearances of the display elements will be customized is not limited to the online shopping mall.

FIG. 5 is a diagram showing a specific example of content registered in the customization definition information DB 12b according to the embodiment. FIG. 5 displays a display element name of a display element to be customized, instead of the display element ID of the display element. For convenience of explanation, FIG. 5 shows category and question content of Q&A. The content of Q&A is registered in a database different from customization definition information DB 12b.

The Q&A whose Q&A-ID is 001 is a Q&A related to delivery. As a display element to be customized corresponding to the Q&A, the delivery explanation link 104 is set. In other words, the delivery explanation link 104 is defined to be associated with a Q&A related to delivery. A user who browses a Q&A related to delivery may actually browse a detailed explanation of the delivery in an individual item for sale page.

The Q&A whose Q&A-ID is 002 and the Q&A whose Q&A-ID is 003 are Q&As related to the shopping cart. As display elements to be customized corresponding to the Q&As, the shopping cart link 101 and the shopping cart input button 102 are set. Both of the shopping cart link 101 and the shopping cart input button 102 are display elements to display the shopping cart page. Therefore, the degree of inter-display-element association is set to "strong". In other words, the shopping cart link 101 and the shopping cart input button 102 are defined to be associated with a Q&A related to the shopping cart. For example, when the user wants to input an item for sale into the shopping cart and when the user wants to see the shopping cart, the user may solve a question about how to use the shopping cart by browsing Q&As. Therefore, the user who browses the Q&As related to the shopping cart may operate the shopping cart link 101 and the shopping cart input button 102.

The Q&A whose Q&A-ID is 004 is a Q&A related to a purchase of an item for sale. As display elements to be customized corresponding to the Q&A, the shopping cart input button 102 and a group buying button are set. The group buying button is a button to group-buy the item for sale whose information is displayed in the item for sale page. The group buying is a mechanism in which the greater the final number of sold items for sale for the group buying, the lower the unit sales price. Whether an item for sale is an item for normal buying or an item for group buying is set for each item for sale by the shop. In the item for sale page of an item for sale where the normal buying is set, the shopping cart input button 102 is displayed. On the other hand, in the item for sale page of an item for sale where the group buying is set, the group buying button is displayed. When the group buying button is selected, the item for sale is not inputted into the shopping cart and the user directly proceeds to the purchase procedure. Even when the same item for sale is purchased, an operation way of purchase of the item for sale is different between the shopping cart input button 102 and the group buying button. Therefore, the degree of inter-display-element association is set to "weak".

For example, the user may solve a question about how to purchase an item for sale by browsing Q&A. Therefore, the user who browses Q&A related to purchase may operate the shopping cart input button 102 or the group buying button which are necessary to purchase the item for sale displayed in the item for sale page.

The Q&A whose Q&A-ID is 005 and the Q&A whose Q&A-ID is 006 are Q&As related to payment. As a display element to be customized corresponding to the Q&As, the payment method explanation link 103 is set. The Q&A whose Q&A-ID is 007 is a Q&A related to return. As a display element to be customized corresponding to the Q&A, the return explanation link 105 is set.

The display element to be customized may be different between Q&As belonging to the same category.

Next, the Q&A browsing history DB 12c will be described. FIG. 3C is a diagram showing an example of content registered in the Q&A browsing history DB 12c according to the embodiment. In the Q&A browsing history DB 12c, a browsing history of Q&A by each user is registered. Specifically, in the Q&A browsing history DB 12c, a history record (an example of history information of the present invention) that stores a user ID, a Q&A-ID, a latest browsing date and time (an example of time information of the present invention), and the number of browsing times is registered for each user who browses Q&A and for each browsed Q&A. The user ID is a user ID of a user who browsed the Q&A. The Q&A-ID is a Q&A-ID of the Q&A browsed by the user indicated by the user ID. The latest browsing date and time indicates a date and time when the Q&A indicated by the Q&A-ID was browsed most recently by the user indicated by the user ID. The number of browsing times indicates the number of times that the Q&A indicated by the Q&A-ID was browsed by the user indicated by the user ID. The number of browsing times is information registered to be referred to by an operator of the site. The operator utilizes the number of browsing times registered in the Q&A browsing history DB 12c to improve the site. For example, when the number of browsing times of a certain Q&A is greater than the numbers of browsing times of other Q&As, the method for using the site and the services related to the certain Q&A may be unclear. The operator can review the design of the site and the like on the basis of the above problem.

FIG. 3D is a diagram showing an example of content registered in the customization element information DB 12d according to the embodiment. In the customization element information DB 12d, customization element information related to a display element whose appearance is changed is registered. Specifically, in the customization element information DB 12d, an element record that stores a user ID, a display element ID, the number of operation times, a degree of customization (an example of difference information of the present invention), and a customization simultaneous ending list is registered for each user and for each display element whose appearance is changed.

The display element ID is identification information of a display element whose appearance is changed from the initial state among the display elements included in the Web page displayed on the user terminal 2 used by the user indicated by the user ID. The number of operation times is the number of times when the display element indicated by the display element ID is operated by the user indicated by the user ID.

The degree of customization indicates a degree of change of the appearance of the display element indicated by the display element ID from the initial state. When the degree of change is high, the degree of customization is set to "high". When the degree of change is low, the degree of customization is set to "low". A plurality of Q&As may be included in one Q&A page. The user specifies a certain Q&A to be displayed and causes a part of a Q&A page to be displayed on a screen of the user terminal 2. At this time, the Q&A specified by the user to be displayed is displayed on the screen and further Q&As that are not specified by the user to be displayed may be displayed. The Q&A specified by the user to be displayed is certainly browsed by the user. On the other hand, since the Q&As that are not specified by the user to be displayed are also displayed on the screen, the Q&As may also be browsed by the user. Therefore, the degree of change of the appearance of the display element from the initial state is set to be different between the Q&A specified by the user to be displayed and the Q&As that are not specified by the user to be displayed among the Q&As displayed on the screen. Specifically, the degree of customization of the display element corresponding to the Q&A specified by the user to be displayed is set to "high". On the other hand, the degree of customization of the display elements corresponding to the Q&As that are not specified by the user to be displayed is set to "low".

The customization simultaneous ending list is a list of display element IDs of display elements whose appearances are returned to the initial state at the same time when the appearance of the display element indicated by the display element ID returns to the initial state. When a plurality of display elements are to be customized and a Q&A whose degree of inter-display-element association is set to "strong" is browsed, a display element ID is registered in the customization simultaneous ending list.

Here, a specific example of content registered in the customization element information DB 12d will be described. Here, Q&A in the online shopping mall will be described as an example. The description below is based on the content displayed in the item for sale page shown in FIG. 4 and the content registered in the in the customization definition information DB 12b shown in FIG. 5.

Figure 6A:
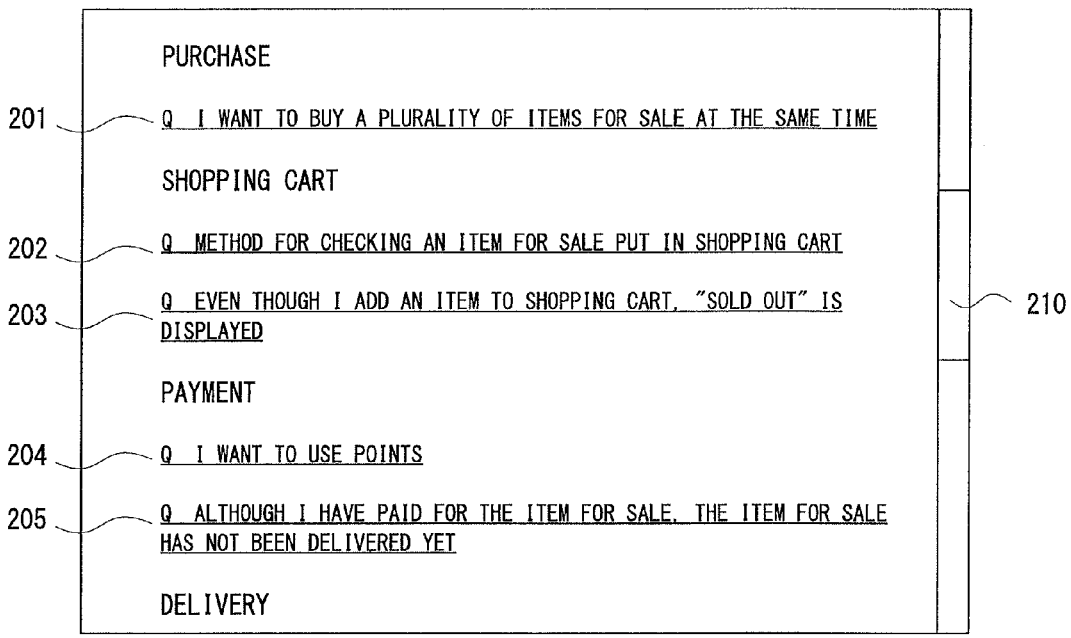
FIG. 6A is a diagram showing a display example of a Q&A contents table page.

FIG. 6A is a diagram showing a display example of a Q&A contents table page. The Q&A contents table page is a Web page on which a list of question contents of Q&As is displayed as a table of contents of the Q&As. In the example shown in FIG. 6A, questions 201 to 205 are displayed in the Q&A contents table page. The questions 201 to 205 are links to display positions of corresponding Q&As in the Q&A contents table page. The question 201 is a question of Q&A whose Q&A-ID is 004. The question 202 is a question of Q&A whose Q&A-ID is 002. The question 203 is a question of Q&A whose Q&A-ID is 003. The question 204 is a question of Q&A whose Q&A-ID is 005. The question 205 is a question of Q&A whose Q&A-ID is 006. A certain user X can change a range in which the Q&A contents table page is displayed on the screen by operating a scroll bar 210.

Figure 6B:
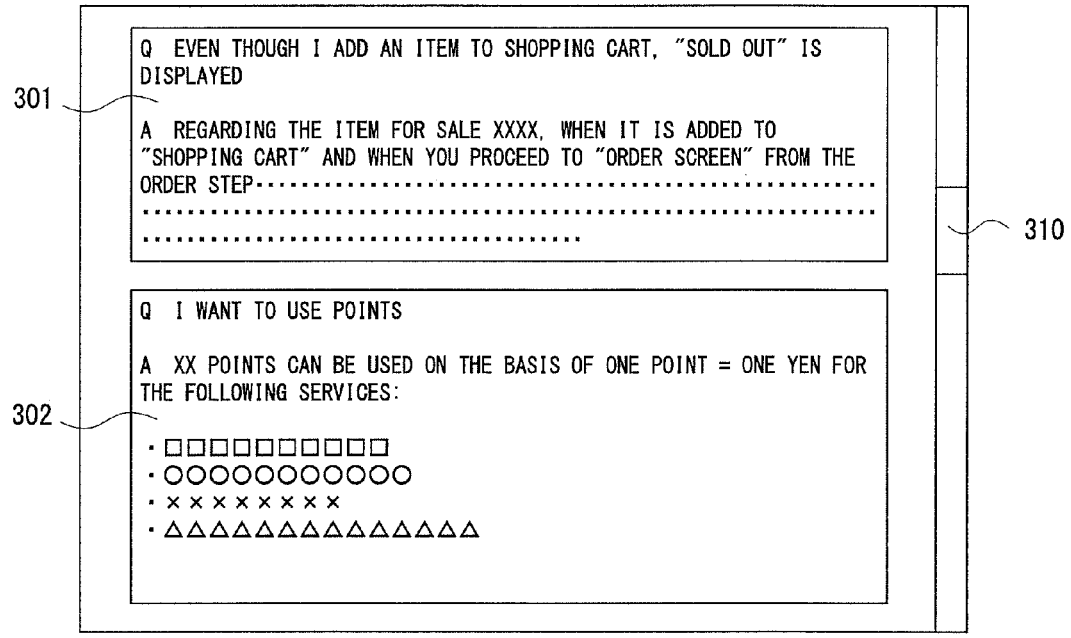
FIG. 6B is a diagram showing a display example of a Q&A page.

Here, the user X selects the question 203. In other words, the user X specifies an answer to the question 203 to be displayed. Then, a Q&A page is displayed on the screen. FIG. 6B is a diagram showing a display example of the Q&A page. As shown in FIG. 6B, a Q&A 301 is displayed on the Q&A page. The Q&A 301 is a question and an answer of a Q&A whose Q&A-ID is 003. Further, a Q&A 302 is displayed on the Q&A page. The Q&A 302 is a question and an answer of a Q&A whose Q&A-ID is 005. The Q&A 302 is a Q&A that is not specified by the user X to be displayed.

As shown in FIG. 5, in the definition record whose Q&A-ID is 003, the display element IDs of the shopping cart link 101 and the shopping cart input button 102 are registered. Therefore, in the customization element information DB 12d, the definition record that stores the display element ID of the shopping cart link 101 and the definition record that stores the display element ID of the shopping cart input button 102 are registered. The degree of customization stored in each definition record is set to "high". The degree of inter-display-element association stored in the definition record whose Q&A-ID is 003 is set to "strong". Therefore, in the customization simultaneous ending list stored in an element record that stores the display element ID of the shopping cart link 101, the display element ID of the shopping cart input button 102 is registered. In the customization simultaneous ending list stored in a definition record that stores the display element ID of the shopping cart input button 102, the display element ID of the shopping cart link 101 is registered.

On the other hand, in the definition record whose Q&A-ID is 005, the display element ID of the payment method explanation link 103 is stored. Therefore, in the customization element information DB 12d, further, an element record that stores the display element ID of the payment method explanation link 103 is registered. The degree of customization stored in the element record is set to "low".

Here, the user X can change a range in which the Q&A page is displayed on the screen by operating a scroll bar 310. When another Q&A is displayed on the screen by the operation of the scroll bar 310, an element record that stores the display element to be customized corresponding to the newly displayed Q&A is registered in the customization element information DB 12d. The degree of customization stored in the element record is set to "low".

Figure 7:
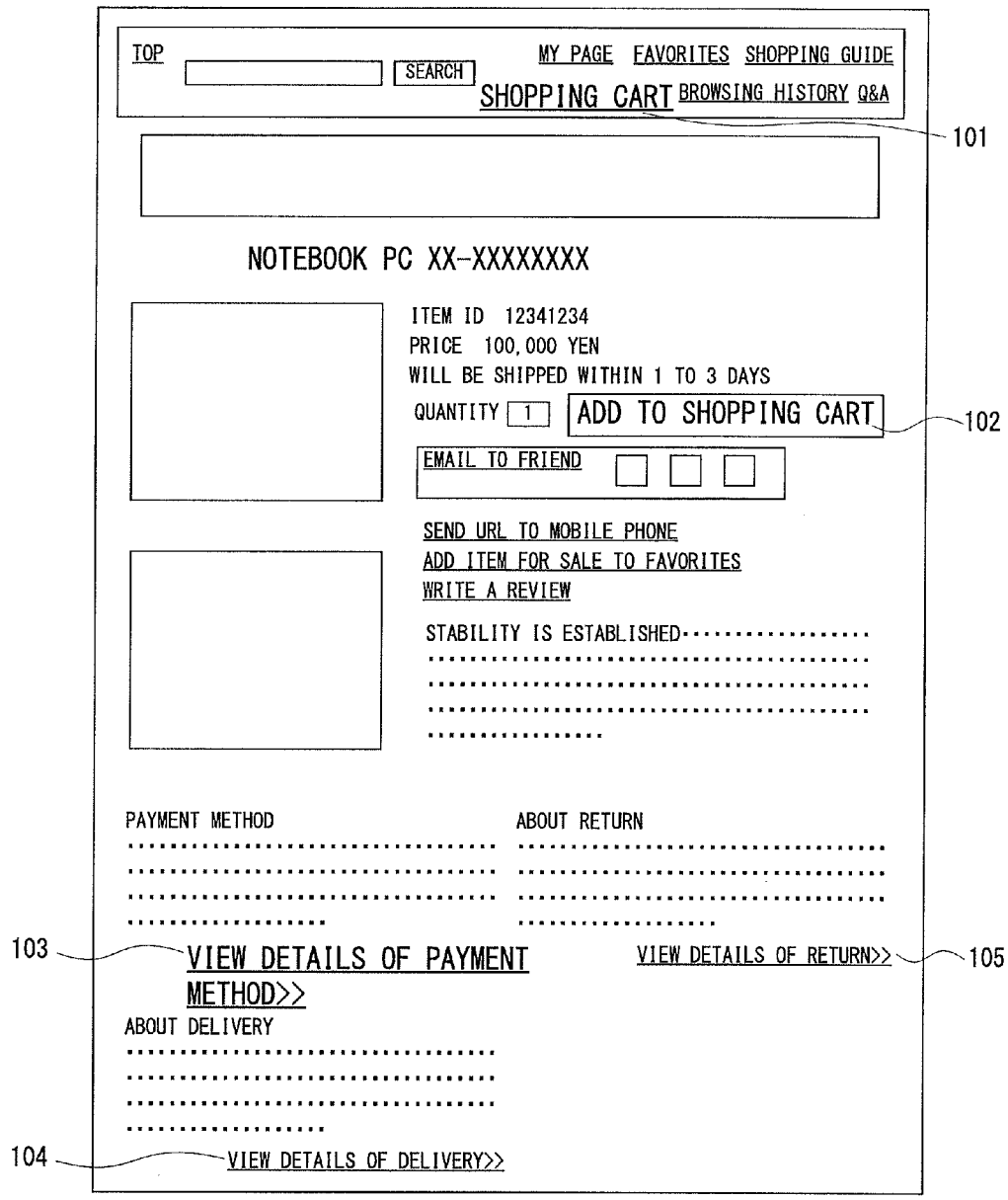
FIG. 7 is a diagram showing a display example of an item for sale page in which appearances of apart of display elements is changed.

FIG. 7 is a diagram showing a display example of an item for sale page in which appearances of a part of display elements is changed. The example shown in FIG. 7 is an example in which the display sizes of the display elements are enlarged as a method of changing the appearance.

The user X tries to display the item for sale page shown in FIG. 4 on the user terminal 2 after browsing Q&A. Then, the item for sale page as shown in FIG. 7 is displayed on the screen. As shown in FIG. 7, the appearances of the shopping cart link 101, the shopping cart input button 102, and the payment method explanation link 103 are changed from the appearances in the initial state. As a result, the display sizes of the display elements are greater than the display sizes in the initial state. In the customization element information DB 12d, the degrees of customization of the shopping cart link 101 and the shopping cart input button 102 are set to "high" and the degree of customization of the payment method explanation link 103 is set to "low". Therefore, the magnification of the display size of the shopping cart link 101 and the shopping cart input button 102 is greater than the magnification of the display size of the payment method explanation link 103.

When the user X cause the user terminal 2 to display an item for sale page different from the item for sale page shown in FIG. 7, the appearances of the shopping cart link 101, the shopping cart input button 102, and the payment method explanation link 103 are changed in the same manner.

Next, information stored in the storage unit 12 will be described. The storage unit 12 stores various data such as an HTML (Hyper Text Markup Language) documents for displaying Web pages of each site, an XML (eXtensible Markup Language) documents, image data, text data, and an electronic documents. The storage unit 12 also stores various setting values.

Here, among tags described in the HTML documents, tags that define display elements to be customized include class attributes. The class attribute includes the display element ID of the display element. Thereby, whether or not a display element to be customized is included in a Web page is known. In the HTML document, an appearance of each display element is defined. For example, the appearance of the display element is described in a tag that defines the display element or described in a style sheet. The appearances defined in the HTML document stored in the storage unit 12 in advance are the appearances in the initial state.

The system control unit 14 acquires an HTML document corresponding to a request transmitted from the user terminal 2 from the storage unit 12. At this time, the system control unit 14 rewrites the definition of the appearances of display elements whose appearance is changed. Then, the system control unit 14 transmits the HTML document in which the definition of the appearances is rewritten as needed to the user terminal 2.

In an HTML document of a Q&A page, a script for recording a browsing history of Q&A is described. The user terminal 2 transmits a browsing history recording request including a Q&A-ID of a Q&A displayed on the screen to the service providing server 1 by executing the script. The system control unit 14 updates the Q&A browsing history DB 12c on the basis of the received browsing history recording request.

The storage unit 12 also stores an operating system and a WWW (World Wide Web) server program. The storage unit 12 also stores a program for the service providing server 1 to perform a process related to each site. The storage unit 12 also stores a customization management program (an example of information generation program of the present invention) for the service providing server 1 to perform various processes related to the customization of the appearances of the display elements included in Web pages. For example, the customization management program and the like may be acquired from another server device or the like through the network NW or may be recorded in a recording medium such as a DVD (Digital Versatile Disc) and read through a drive device.

The input/output interface 13 performs interface processing among the communication unit 11, the storage unit 12, and the system control unit 14.

The system control unit 14 includes a CPU (Central Processing Unit) 14a, a ROM (Read Only Memory) 14b, a RAM (Random Access Memory) 14c, and the like. The CPU 14a reads and executes a shopping site management program and the like, so that the system control unit 14 functions as a recording means, a generation means, a transmission means, a reception means, an acquisition means, a first determination means, a second determination means, a first reception means, a second reception means, a second recording means, and a third determination means of the present invention.

The service providing server 1 may include a plurality of server devices. The plurality of server devices may be connected with each other through a LAN (Local Area Network) or the like. For example, for each site, there may be a server device that transmits a Web page of the site and a server device that performs a process related to the site. There may be an independent server device that manages various databases. There may be an independent server device that performs various processes related to the customization of the appearances of the display elements included in Web pages.

3. Operation of Service Providing System

Next, an operation of the service providing system S will be described with reference to FIGS. 8 to 14.

3. 1 Operation of User Terminal

Figure 8:
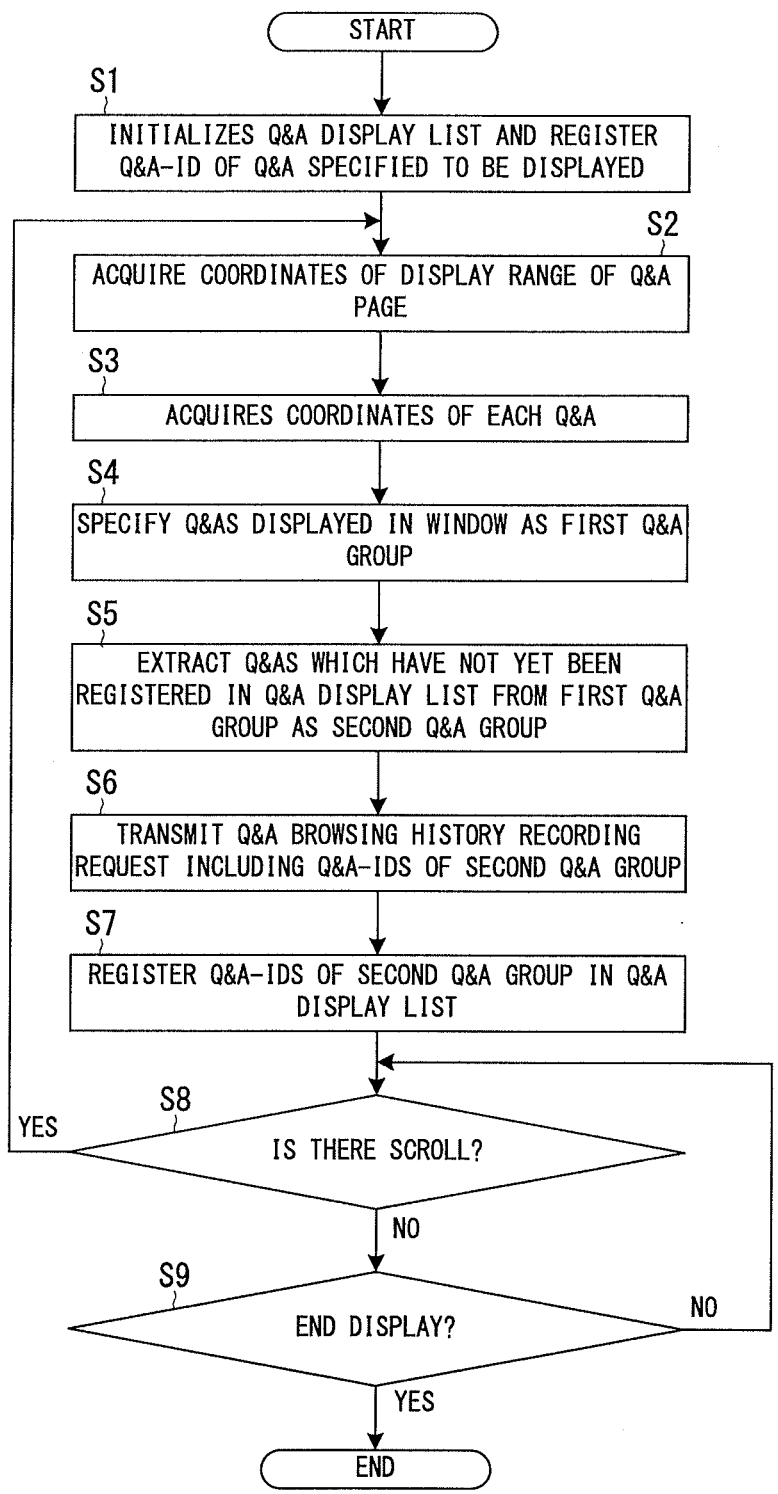
FIG. 8 is a flowchart showing a process example of a user terminal 2 according to an embodiment.

FIG. 8 is a flowchart showing a process example of the user terminal 2 according to the embodiment.

When a Q&A contents table page is displayed on the screen of the user terminal 2, a user selects one of questions to specify a Q&A to be displayed. Then, the user terminal 2 acquires a Q&A-ID of a Q&A corresponding to the selected question. The user terminal 2 transmits a request including the acquired Q&A-ID as a request Q&A-ID to the service providing server 1 as a request requesting an HTML document of a Q&A page. The user terminal 2 receives the HTML document of the Q&A page transmitted from the service providing server 1. Subsequently, the user terminal 2 displays the Q&A page on a screen on the basis of the received HTML document. When the display process of the Q&A page is completed, the user terminal 2 executes a script for recording a browsing history. The script is described in the received HTML document. The process shown in FIG. 8 is a process performed based on the script for recording a browsing history.

First, the user terminal 2 initializes a Q&A display list and registers the Q&A-ID of the Q&A specified by the user to be displayed in the Q&A display list (step S1). The Q&A display list is a list showing Q&As that have been displayed on the screen among the Q&As included in the Q&A page. Since it is known in advance that the Q&A specified by the user to be displayed is displayed on the screen, the Q&A-ID of the Q&A is registered.

Next, the user terminal 2 acquires coordinates of a display range of the Q&A page. In other words, the user terminal 2 specifies what range of the Q&A page is displayed on the screen (step S2). Next, the user terminal 2 acquires coordinates of display positions of each Q&A in the Q&A page (step S3). Next, the user terminal 2 specifies the Q&As displayed on the screen as a first Q&A group on the basis of the coordinates acquired in steps S2 and S3 (step S4). Here, the user terminal 2 may extract only Q&As which are entirely displayed on the screen or may extract Q&As which are entirely or partially displayed on the screen.

Next, the user terminal 2 extracts Q&As whose display element ID is not registered in the Q&A display list from the first Q&A group as a second Q&A group (step S5). Next, the user terminal 2 transmits a browsing history recording request including the display element IDs of the extracted second Q&A group as request Q&A-IDs to the service providing server 1 (step S6). The browsing history recording request is an asynchronous request. Next, the user terminal 2 registers the display element IDs of the second Q&A group in the Q&A display list (step S7). If there is no Q&A corresponding to the second Q&A group, the processes of steps S6 and S7 are not performed.

The service providing server 1 can identify the Q&A specified to be displayed from the Q&A-ID included in the request of the HTML document of the Q&A page. Therefore, the user terminal 2 need not transmit again the Q&A-ID of the Q&A specified to be displayed to the service providing server 1. Therefore, the browsing history recording request does not include the Q&A-ID of the Q&A specified to be displayed.

Next, the user terminal 2 determines whether or not the Q&A page is scrolled by an operation of the user (step S8). At this time, if the user terminal 2 determines that the Q&A page is scrolled (step S8: YES), the user terminal 2 proceeds to step S2. When the Q&A page is scrolled, the range of the Q&A page displayed on the screen is changed. Therefore, the user terminal 2 extracts the first Q&A group displayed on the screen again. The user terminal 2 extracts the second Q&A group which has not been displayed from the first Q&A group.

Every time the service providing server 1 receives the browsing history recording request, the service providing server 1 updates the number of browsing times of the Q&A indicated by the Q&A-ID included in the browsing history recording request. If the user performs the scroll operation many times, a Q&A that has been displayed on the screen may be displayed on the screen again. In this case, if the user terminal 2 transmits the Q&A-ID of the displayed Q&A to the service providing server 1, the number of browsing times increases more than necessary. Therefore, the Q&A-ID of each Q&A is controlled to be transmitted at most once to the service providing server 1.

In step S8, if the user terminal 2 determines that the Q&A page is not scrolled (step S8: NO), the user terminal 2 determines whether or not the display of the Q&A page is ended (step S9). For example, the display of the Q&A page is ended when the user performs an operation to display a Web page different from the currently displayed Web page or when the user performs an operation to end a browser. Here, if the user terminal 2 determines that the display of the Q&A page is not ended (step S9: NO), the user terminal 2 proceeds to step S8. On the other hand, if the user terminal 2 determines that the display of the Q&A page is ended (step S9: YES), the user terminal 2 ends the process shown in FIG. 8.

3. 2 Operation of Service Providing Server

Figure 9:
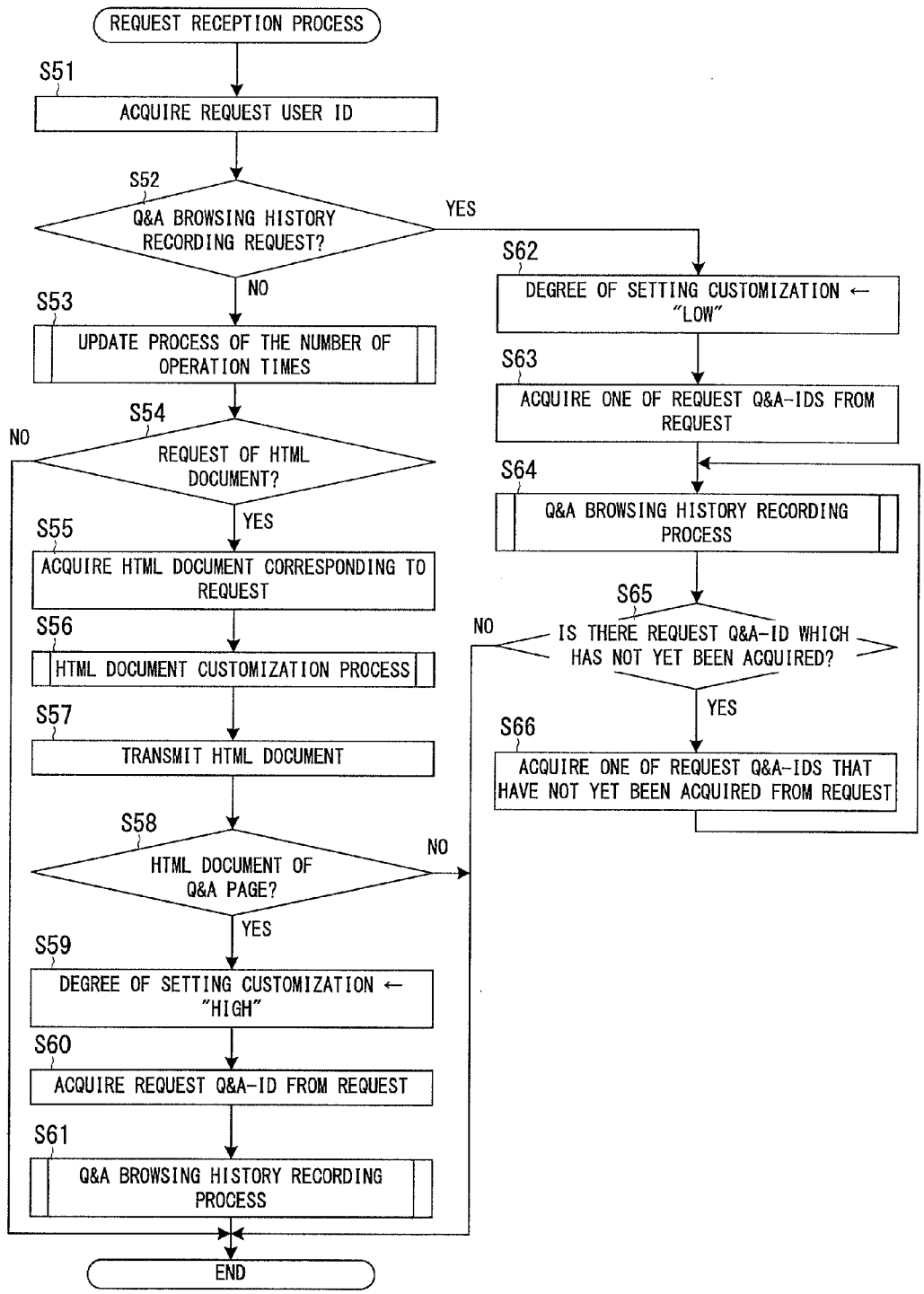
FIG. 9 is a flowchart showing a process example of a request reception process of a system control unit 14 of a service providing server 1 according to an embodiment.

FIG. 9 is a flowchart showing a process example of a request reception process of the system control unit 14 of the service providing server 1 according to the embodiment.

The request reception process is started when the service providing server 1 receives a request from the user terminal 2. First, as the reception means, the system control unit 14 acquires a request user ID (step S51). The request user ID is a user ID of a user who uses the user terminal 2 that has transmitted the request.

For example, when the user logs in to a general site, the user terminal 2 transmits a user ID and a password inputted by the user to the service providing server 1. The service providing server 1 authenticates the user on the basis of the received information. When the authentication is successfully performed, the service providing server 1 transmits the received user ID (the user ID may be encrypted) as a cookie to the user terminal 2. Then, the user ID as a cookie is added to a request transmitted from the user terminal 2 thereafter. Therefore, the system control unit 14 can acquire a request user ID. For example, the system control unit 14 may add a user ID to a URL (Uniform Resource Locator) included in a Web page transmitted to the user terminal 2. Thereby, the user ID is added to a URL included in a request transmitted from the user terminal 2 to the service providing server 1.

Next, the system control unit 14 determines whether or not a received Q&A request is the browsing history recording request (step S52). At this time, if the system control unit 14 determines that the received Q&A request is not the browsing history recording request (step S52: NO), the system control unit 14 performs an update process of the number of operation times described later (step S53). In the update process of the number of operation times, the number of times that a display element whose appearance is changed is operated is updated.

Next, the system control unit 14 determines whether or not the received request is a request of an HTML document (step S54). At this time, if the system control unit 14 determines that the received request is not a request of an HTML document (step S54: NO), the system control unit 14 performs a process according to the request and ends the request reception process.

On the other hand, if the system control unit 14 determines that the received request is a request of an HTML document (step S54: YES), the system control unit 14 acquires an HTML document corresponding to the request from the storage unit 12 (step S55). Next, the system control unit 14 performs an HTML document customization process described later (step S56). In the HTML document customization process, the HTML document to be transmitted to the user terminal 2 is generated so that the appearance of a display element whose appearance is to be changed differs from the appearance in the initial state. Specifically, among the definitions of the appearances described in the acquired HTML document, definitions of display elements whose appearance are changed are rewritten.

Next, as the transmission means, the system control unit 14 transmits the HTML document, which is rewritten if necessary in the HTML document customization process, to the user terminal 2 which is the transmission source of the request (step S57).

Next, the system control unit 14 determines whether or not the transmitted HTML document is an HTML document of a Q&A page (step S58). At this time, if the system control unit 14 determines that the transmitted HTML document is not an HTML document of a Q&A page (step S58: NO), the system control unit 14 ends the request reception process.

On the other hand, if the system control unit 14 determines that the transmitted HTML document is an HTML document of a Q&A page (step S58: YES), the system control unit 14 sets a degree of setting customization to "high" (step S59). Next, the system control unit 14 acquires the request Q&A-ID from the received request (step S60).

Next, the system control unit 14 performs a Q&A browsing history recording process described later (step S61). In the Q&A browsing history recording process, the number of browsing times of a browsed Q&A is updated. At this time, the number of browsing times of the Q&A indicated by the Q&A-ID is updated. Also, in the Q&A browsing history recording process, information of a display element to be customized corresponding to the browsed Q&A is registered in the customization element information DB 12d. The degree of customization at this time is set to the degree of setting customization. In a request that requests an HTML document of a Q&A page, the Q&A-ID of the Q&A specified to be displayed is included as a request Q&A-ID. Therefore, the degree of customization is set to "high".

When the system control unit 14 completes the Q&A browsing history recording process, the system control unit 14 ends the request reception process.

In step S52, if the system control unit 14 determines that the received Q&A request is the browsing history recording request (step S52: YES), the system control unit 14 sets the degree of setting customization to "low" (step S62). Next, the system control unit 14 acquires one of the request Q&A-IDs from the received request (step S63). Next, the system control unit 14 performs the Q&A browsing history recording process (step S64). In the browsing history recording request, a Q&A-ID of a Q&A which is not specified to be displayed among the Q&As displayed on the screen of the user terminal 2 is included as a request Q&A-ID. Therefore, the degree of customization is set to "low".

Next, the system control unit 14 determines whether or not there is a request Q&A-ID which has not yet been acquired from the browsing history recording request (step S65). At this time, if the system control unit 14 determines that there is one or more request Q&A-IDs that have not yet been acquired (step S65: YES), the system control unit 14 acquires one of the request Q&A-IDs that have not yet been acquired (step S66). Next, the system control unit 14 proceeds to step S64. The system control unit 14 repeats the process from step S64 to step S66, so that the system control unit 14 updates the number of browsing times of each Q&A that is not specified to be displayed among the Q&As displayed on the screen of the user terminal 2.

On the other hand, when the system control unit 14 determines that the system control unit 14 has acquired all the request Q&A-IDs included in the browsing history recording request (step S65: NO), the system control unit 14 ends the request reception process.

Figure 10:
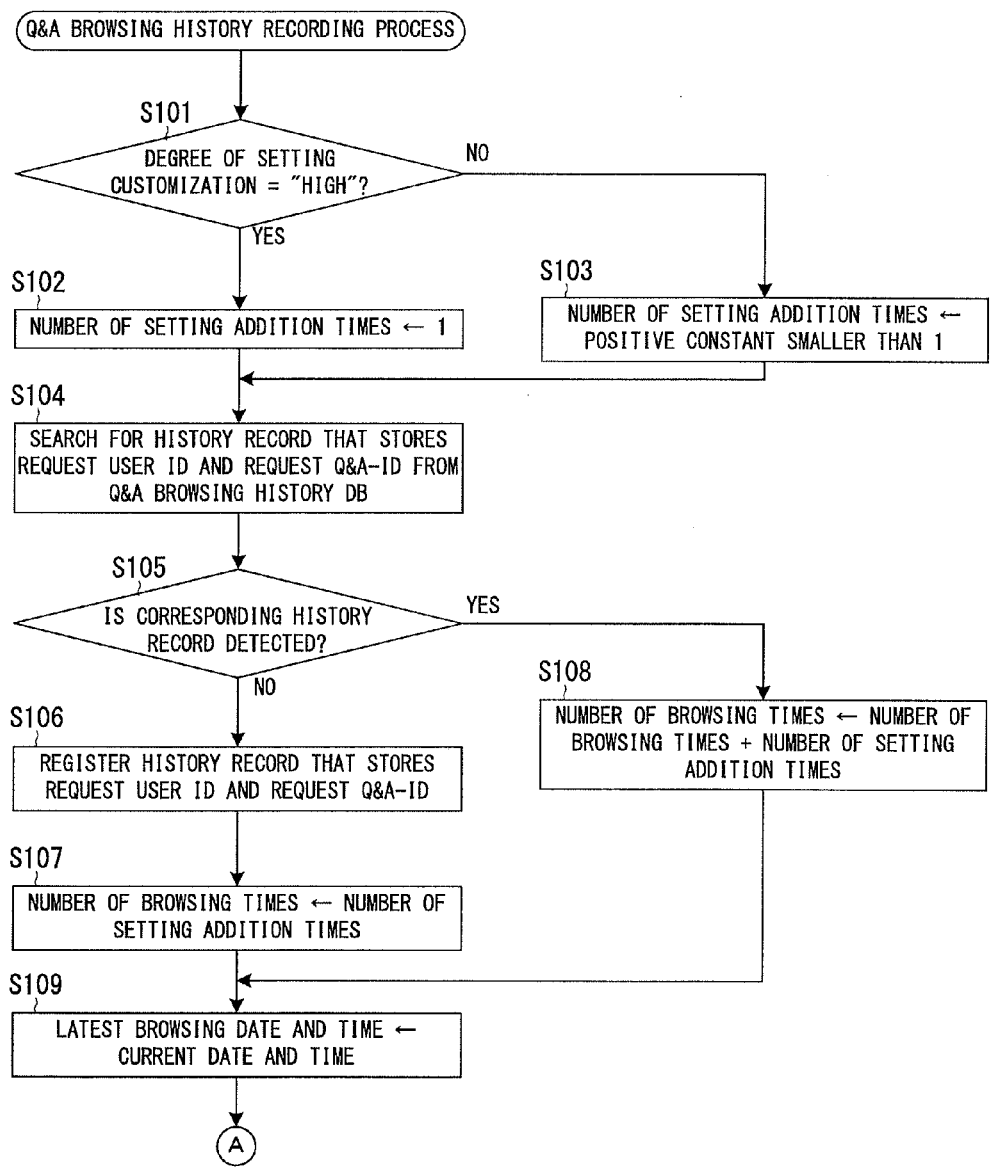
FIG. 10 is a flowchart showing a process example of a Q&A browsing history recording process of the system control unit 14 of a service providing server 1 according to an embodiment.
Figure 11:
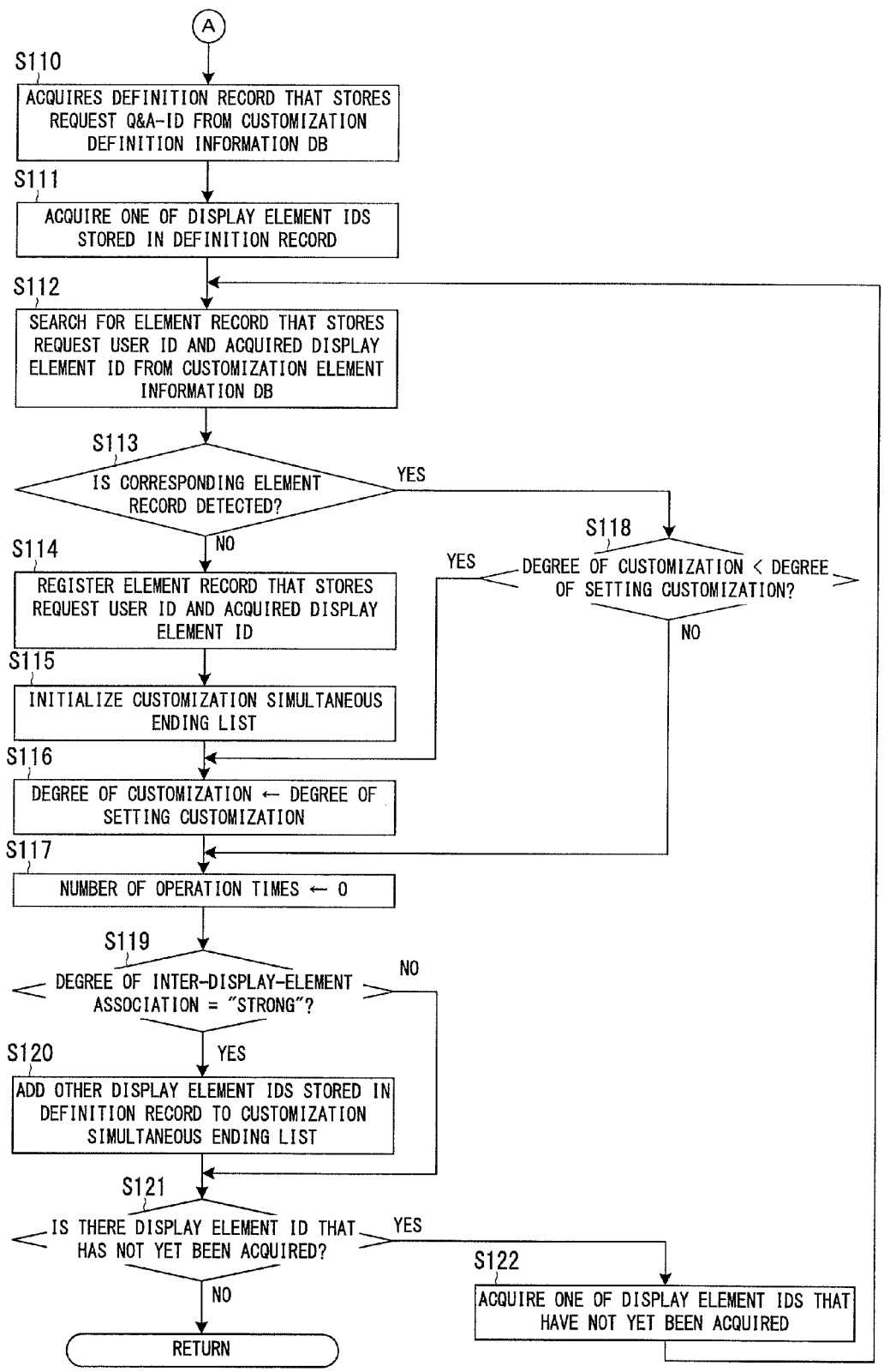
FIG. 11 is a flowchart showing a process example of the Q&A browsing history recording process of the system control unit 14 of a service providing server 1 according to an embodiment.

FIGS. 10 and 11 are flowcharts showing a process example of the Q&A browsing history recording process of the system control unit 14 of the service providing server 1 according to the embodiment.

As shown in FIG. 10, as the recording means, the system control unit 14 which receives a request as the reception means, the first reception means, and the second reception means records a Q&A-ID of a browsed Q&A and updates the number of browsing times. First, the system control unit 14 determines whether or not the degree of setting customization is set to "high" (step S101). At this time, if the system control unit 14 determines that the degree of setting customization is set to "high" (step S101: YES), the system control unit 14 sets the number of setting addition times to 1 (step S102). The number of setting addition times is the number of times which is added to the number of browsing times of Q&A. On the other hand, if the system control unit 14 determines that the degree of setting customization is set to "low" (step S101: NO), the system control unit 14 sets the number of setting addition times to a positive constant smaller than 1 (step S103). When the degree of setting customization is "low", the Q&A indicated by the request Q&A-ID is displayed on the screen, but the Q&A is not specified to be displayed. In this case, it is not known whether or not the Q&A is actually browsed by the user. Therefore, 1 is too great as the number to be added to the number of browsing times. Thus, a positive constant smaller than 1 is set as the number of setting addition times. For example, the constant is determined by the administrator of the system and stored in the storage unit 12.

When the system control unit 14 completes the process of step S102 or S103, the system control unit 14 searches for a history record that stores a request user ID and a request Q&A-ID from the Q&A browsing history DB 12c (step S104). Next, the system control unit 14 determines whether or not a corresponding history record is detected (step S105). At this time, if the system control unit 14 determines that a corresponding history record is not detected (step S105: NO), the system control unit 14 registers a history record that stores a request user ID and a request Q&A-ID in the Q&A browsing history DB 12c (step S106). Next, the system control unit 14 sets the number of browsing times stored in the registered history record to the number of setting addition times (step S107).

On the other hand, if the system control unit 14 determines that a corresponding history record is detected (step S105: YES), the system control unit 14 adds the number of setting addition times to the number of browsing times stored in the detected history record (step S108).

When the system control unit 14 completes the process of step S107 or S108, the system control unit 14 sets the latest browsing date and time stored in the registered or detected history record to the current date and time (step S109).

Next, as shown in FIG. 11, the system control unit 14 registers information of the display element to be customized corresponding to the browsed Q&A in the customization element information DB 12d. First, the system control unit 14 acquires a definition record that stores the request Q&A-ID from the customization definition information DB 12b (step S110). Next, the system control unit 14 acquires one of the display element IDs stored in the definition record (step S111).

Next, the system control unit 14 searches for an element record that stores the request user ID and the acquired display element ID from the customization element information DB 12d (step S112). Next, the system control unit 14 determines whether or not a corresponding element record is detected (step S113). At this time, if the system control unit 14 determines that a corresponding element record is not detected (step S113: NO), the system control unit 14 registers an element record that stores a request user ID and the acquired display element ID in the customization element information DB 12d (step S114).

Next, the system control unit 14 initializes the customization simultaneous ending list stored in the registered element record (step S115). Next, as the second recording means, the system control unit 14 sets the degree of customization stored in the registered element record to the degree of setting customization (step S116). Next, the system control unit 14 sets the number of operation times stored in the registered element record to 0 (step S117).

In step S113, if the system control unit 14 determines that a corresponding element record is detected (step S113: YES), the system control unit 14 determines whether or not the degree of customization stored in the detected element record is lower than the degree of setting customization (step S118). In other words, the system control unit 14 determines whether or not the current degree of customization is "low" and the degree of setting customization is "high". At this time, if the system control unit 14 determines that the degree of customization stored in the detected element record is lower than the degree of setting customization (step S118: YES), the system control unit 14 sets the degree of customization stored in the detected element record to the degree of setting customization (step S116). In this case, the Q&A indicated by the request Q&A-ID was displayed on the screen of the user terminal 2 in the past, but the Q&A is not specified by the user to be displayed. The request received this time makes it clear that the Q&A is specified by the user to be displayed. Therefore, the degree of customization of the display element to be customized corresponding to the Q&A is set to "high".

Next, the system control unit 14 sets the number of operation times stored in the detected element record to 0 (step S117). The number of operation times stored in the element record is the number of times when the display element is operated after the Q&A was browsed most recently. Therefore, every time a Q&A is browsed, the number of operation times of the display element to be customized corresponding to the Q&A is reset.

In step S118, if the system control unit 14 determines that the degree of customization stored in the detected element record is not lower than the degree of setting customization (step S118: NO), the system control unit 14 sets the number of operation times stored in the detected element record to 0 (step S117).

When the system control unit 14 completes the process of step S117, as the third determination means, the system control unit 14 determines whether or not the degree of inter-display-element association stored in the definition record acquired from the customization definition information DB 12b is set to "strong" (step S119). At this time, if the system control unit 14 determines that the degree of inter-display-element association is set to "strong" (step S119: YES), the system control unit 14 adds the display element IDs stored in the definition record other than the display element ID acquired this time to the customization simultaneous ending list stored in the registered or detected element record (step S120). Next, the system control unit 14 proceeds to step S121.

On the other hand, if the system control unit 14 determines that the degree of inter-display-element association is set to "weak" or the degree of inter-display-element association is set to neither "strong" nor "weak" (step S119: NO), the system control unit 14 proceeds to step S121. The case in which the degree of inter-display-element association is set to neither "strong" nor "weak" is a case in which only one display element ID of a display element to be customized is stored in the definition record.

In step S121, the system control unit 14 determines whether or not there is a display element ID that has not yet been acquired from the definition record. At this time, if the system control unit 14 determines that there are one or more display element IDs that have not yet been acquired (step S121: YES), the system control unit 14 acquires one of the display element IDs that have not yet been acquired (step S122). Next, the system control unit 14 proceeds to step S112. The system control unit 14 repeats the process from step S112 to step S122, so that the system control unit 14 registers a definition record of each display element to be customized corresponding to a browsed Q&A or a Q&A displayed on the screen in the customization element information DB 12d.

On the other hand, when the system control unit 14 determines that the system control unit 14 has acquired all the display element IDs from the definition record (step S121: NO), the system control unit 14 ends the Q&A browsing history recording process.

Figure 12:
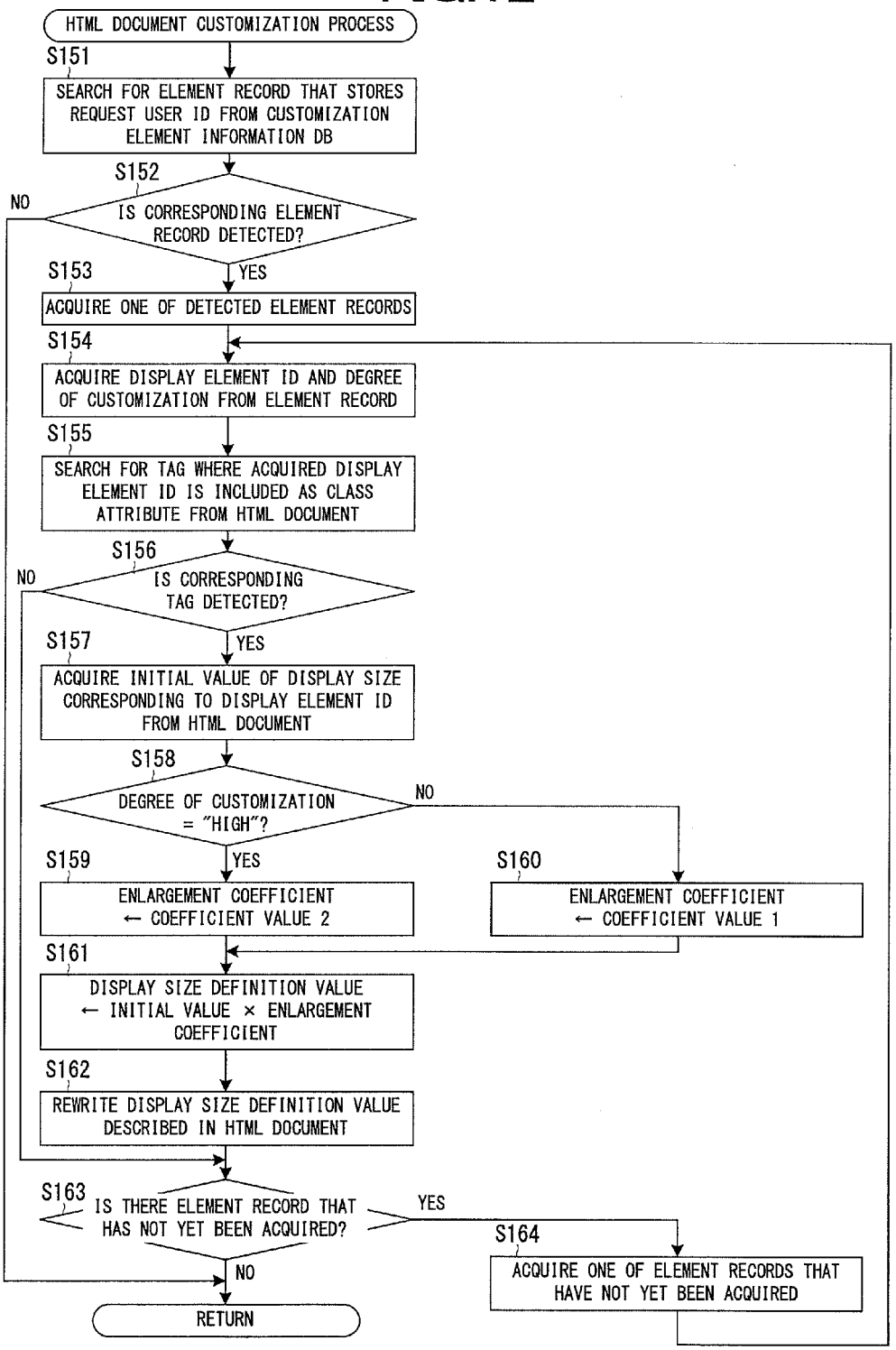
FIG. 12 is a flowchart showing a process example of an HTML document customization process of the system control unit 14 of a service providing server 1 according to an embodiment.

FIG. 12 is a flowchart showing a process example of the HTML document customization process of the system control unit 14 of the service providing server 1 according to the embodiment. The example shown in FIG. 12 is an example in which the display size is enlarged from the display size in the initial state as a method of changing an appearance of a display element.

In the HTML document customization process, as the generation means, the system control unit 14 generates an HTML document in which the appearance of each display element is set for each user. First, the system control unit 14 searches for an element record that stores the request user ID from the customization element information DB 12d (step S151). Next, the system control unit 14 determines whether or not a corresponding element record is detected (step S152). At this time, if the system control unit 14 determines that a corresponding element record is not detected (step S152: NO), the system control unit 14 ends the HTML document customization process. In other words, there is no display element whose appearance is to be changed, so that the HTML document acquired from the storage unit 12 is transmitted to the user terminal 2 without being rewritten.

On the other hand, if the system control unit 14 determines that one or more corresponding element records are detected (step S152: YES), the system control unit 14 acquires one of the detected element records from the customization element information DB 12d (step S153). Next, the system control unit 14 acquires the display element ID and the degree of customization from the acquired element record (step S154).

Next, the system control unit 14 searches for a tag where the acquired display element ID is included as a class attribute from an HTML document acquired from the storage unit 12 (step S155). Next, the system control unit 14 determines whether or not a corresponding tag is detected (step S156). At this time, if the system control unit 14 determines that a corresponding tag is detected (step S156: YES), the system control unit 14 acquires a display size definition value indicated by the acquired display element ID from the HTML document (step S157). The value indicated by the display size definition value represents the display size. The display size definition value at this time is an initial value representing the display size in the initial state.

Next, the system control unit 14 determines whether or not the degree of customization acquired from the element record is set to "high" (step S158). At this time, if the system control unit 14 determines that the degree of customization is set to "high" (step S158: YES), the system control unit 14 sets an enlargement coefficient to a coefficient value 2 stored in the storage unit 12 (step S159). On the other hand, if the system control unit 14 determines that the degree of customization is set to "low" (step S158: NO), the system control unit 14 sets the enlargement coefficient to a coefficient value 1 stored in the storage unit 12 (step S160). The enlargement coefficient indicates the magnification of the display size. The coefficient value 1 and the coefficient value 2 are constants that satisfy "1<coefficient value 1<coefficient value 2". In other words, the magnification when the degree of customization is set to "high" is higher than the magnification when the degree of customization is set to "low".

When the system control unit 14 completes the process of step S159 or S160, the system control unit 14 calculates a new display size definition value by multiplying the initial value of the display size acquired from the HTML document by the enlargement coefficient (step S161). Next, the system control unit 14 rewrites the initial value set as the display size definition value described in the HTML document to a new display size definition value (step S162).

If the system control unit 14 determines that a corresponding tag is not detected in step S156 (step S156: NO) or the system control unit 14 completes the process of step S162, the system control unit 14 determines whether or not there is an element record that has not yet been acquired among the element records detected from the customization element information DB 12d (step S163). At this time, if the system control unit 14 determines that there are one or more element records that have not yet been acquired (step S163: YES), the system control unit 14 acquires one of the element records that have not yet been acquired from the customization element information DB 12d (step S164). Next, the system control unit 14 proceeds to step S154. The system control unit 14 repeats the process from step S154 to step S164, so that the system control unit 14 searches for a tag from the HTML document and rewrites the size definition value for each display element whose appearance is changed.

On the other hand, if the system control unit 14 determines that the system control unit 14 acquires all the detected element records (step S163: NO), the system control unit 14 ends the HTML document customization process.

Figure 13:
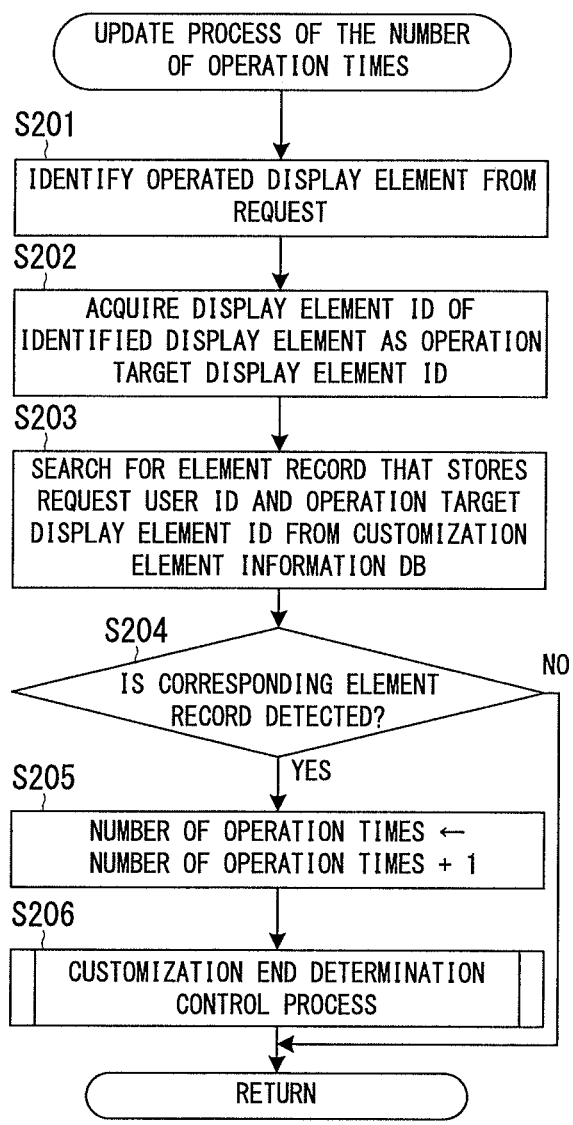
FIG. 13 is a flowchart showing a process example of an update process of the number of operation times of the system control unit 14 of a service providing server 1 according to an embodiment.

FIG. 13 is a flowchart showing a process example of the update process of the number of operation times of the system control unit 14 of the service providing server 1 according to the embodiment.

First, the system control unit 14 identifies a display element operated by a user from a Web page displayed on the screen of the user terminal 2 on the basis of the URL included in the received request (step S201). Next, the system control unit 14 acquires the display element ID of the identified display element as an operation target display element ID (step S202).

Next, the system control unit 14 searches for an element record that stores the request user ID and the operation target display element ID from the customization element information DB 12d (step S203). Next, the system control unit 14 determines whether or not a corresponding element record is detected (step S204). At this time, if the system control unit 14 determines that a corresponding element record is detected (step S204: YES), the system control unit 14 adds 1 to the number of operation times stored in the detected element record (step S205).

Next, the system control unit 14 performs a customization end determination control process (step S206). The customization end determination control process will be described later. In the customization end determination control process, it is determined whether or not to return the appearance of the display element indicated by the operation target display element ID to the appearance in the initial state. When the system control unit 14 completes the process of step S206, the system control unit 14 ends the update process of the number of operation times.

In step S204, if the system control unit 14 determines that a corresponding element record is not detected (step S204: NO), the system control unit 14 ends the update process of the number of operation times. The appearances of display elements that are not registered in the customization element information DB 12d are not changed from the appearances in the initial state. Therefore, in this case, it is not necessary to update the number of operation times.

Figure 14:
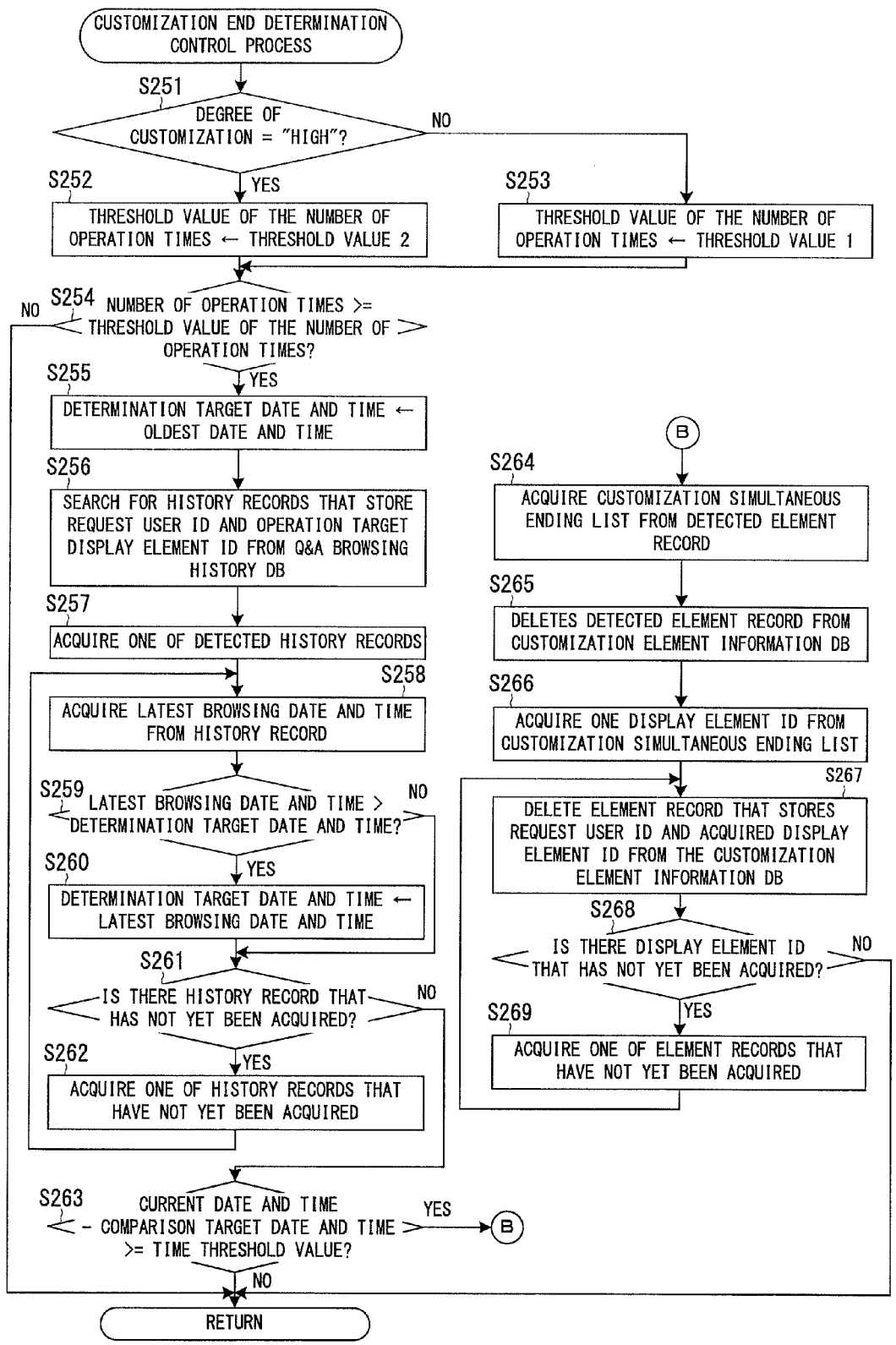
FIG. 14 is a flowchart showing a process example of a customization end determination control process by the system control unit 14 of a service providing server 1 according to an embodiment.

FIG. 14 is a flowchart showing a process example of the customization end determination control process by the system control unit 14 of the service providing server 1 according to the embodiment.

First, the system control unit 14 determines whether or not the degree of customization stored in the element record detected from the customization element information DB 12d, that is, the element record that stores the operation target display element ID, is set to "high" (step S251). At this time, if the system control unit 14 determines that the degree of customization is set to "high" (step S251: YES), the system control unit 14 sets a threshold value of the number of operation times to a threshold value 2 stored in the storage unit 12 (step S252). On the other hand, if the system control unit 14 determines that the degree of customization is set to "low" (step S251: NO), the system control unit 14 sets the threshold value of the number of operation times to a threshold value 1 stored in the storage unit 12 (step S253).

The threshold value of the number of operation times indicates the number of operation times at which the change of the appearance is ended. The threshold value 1 and the threshold value 2 are constants which satisfy "1≤threshold value 1<threshold value 2". In other words, when the degree of customization is set to "low", the appearance returns to the appearance in the initial state by a smaller number of operation times than when the degree of customization is set to "high". When the degree of customization of a display element is set to "low", the corresponding Q&A has been displayed on the screen, but it is unclear whether or not a user has actually browsed the Q&A. Therefore, the necessity of changing the appearance of the display element of the display element is lower than when the display element is determined to have been actually browsed by a user, that is, when the degree of customization is set to "high". Therefore, the condition to end the change of the appearance is set to low for such a display element.

When the system control unit 14 completes the process of step S252 or S253, as the acquisition means and the first determination means, the system control unit 14 determines whether or not the number of operation times stored in the detected element record is greater than or equal to the threshold value of the number of operation times (step S254). At this time, if the system control unit 14 determines that the number of operation times is smaller than the threshold value of the number of operation times (step S254: NO), the system control unit 14 ends the customization end determination control process. In other words, since the condition to end the change of the appearance is not satisfied, the customization end determination control process is ended.

On the other hand, if the system control unit 14 determines that the number of operation times is greater than or equal to the threshold value of the number of operation times (step S254: YES), the system control unit 14 performs initial setting of a determination target date and time by setting the determination target date and time to the oldest date and time that can be set by the system control unit 14 (step S255). The determination target date and time is set to a last browsing date and time of the Q&A corresponding to the display element operated by a user and is compared with the condition to end the change of the appearance. A plurality of Q&As may be to customize the same display element by a definition in the customization definition information DB 12b. In this case, a time passed from a browsing date and time when a user browsed a Q&A most recently among the Q&As which are to customize the same display element is compared with the condition to end the change of the appearance.

First, the system control unit 14 searches for necessary history records from the Q&A browsing history DB 12c (step S256). Specifically, the system control unit 14 searches for definition records that store an operation target display element ID from the customization definition information DB 12b. Next, the system control unit 14 acquires a Q&A-ID stored in each detected definition record. Then, the system control unit 14 searches for a history record that stores the request user ID and the acquired Q&A-ID from the Q&A browsing history DB 12c. The system control unit 14 searches for the history record for each Q&A-ID acquired from the definition records.

When the system control unit 14 completes the process of step S256, the system control unit 14 acquires one of the detected history records from the Q&A browsing history DB 12c (step S257). Next, the system control unit 14 acquires the latest browsing date and time from the acquired history record (step S258). Next, the system control unit 14 determines whether or not the acquired latest browsing date and time is newer than the determination target date and time (step S259). At this time, if the system control unit 14 determines that the latest browsing date and time is newer than the determination target date and time (step S259: YES), the system control unit 14 sets the determination target date and time to the acquired latest browsing date and time (step S260).

If the system control unit 14 determines that the latest browsing date and time is not newer than the determination target date and time (step S259: NO) or when the system control unit 14 completes the process of step S260, the system control unit 14 determines whether or not there is a history record that has not yet been acquired among the detected history records (step S261). At this time, if the system control unit 14 determines that there are one or more history records that have not yet been acquired (step S261: YES), the system control unit 14 acquires one of the history records that have not yet been acquired from the Q&A browsing history DB 12c (step S262). Next, the system control unit 14 proceeds to step S258.

On the other hand, if the system control unit 14 determines that the system control unit 14 has acquired all the detected history records (step S261: NO), as the second determination means, the system control unit 14 determines whether or not a time passed from a comparison target date and time is greater than or equal to a time threshold value stored in the storage unit 12 (step S263). At this time, if the system control unit 14 determines that the time passed from the comparison target date and time is smaller than the time threshold value (step S263: NO), the system control unit 14 ends the customization end determination control process. In other words, since the condition to end the change of the appearance is not satisfied, the customization end determination control process is ended.

On the other hand, if the system control unit 14 determines that the time passed from the comparison target date and time is greater than or equal to the time threshold value (step S263: YES), the system control unit 14 performs a process to end the change of the appearance. Specifically, the system control unit 14 acquires the customization simultaneous ending list from the detected element record, that is, the element record that stores the request user ID and the operation target display element ID (step S264). Next, the system control unit 14 deletes the element record that stores the request user ID and the operation target display element ID from the customization element information DB 12d (step S265). When the element record is deleted, the appearance cannot be changed in the HTML document customization process.

Next, the system control unit 14 acquires one display element ID of the display elements where the change of the appearance is ended at the same time from the acquired customization simultaneous ending list (step S266). Next, the system control unit 14 deletes the element record that stores the request user ID and the display element ID acquired from the customization simultaneous ending list from the customization element information DB 12d (step S267). Next, the system control unit 14 determines whether or not there is a display element ID that has not yet been acquired from the customization simultaneous ending list (step S268). At this time, if the system control unit 14 determines that there are one or more display element IDs that have not yet been acquired (step S268: YES), the system control unit 14 acquires one of the display element IDs that have not yet been acquired (step S269). Next, the system control unit 14 proceeds to step S267.

On the other hand, when the system control unit 14 determines that the system control unit 14 has acquired all the display element IDs from the customization simultaneous ending list (step S268: NO), the system control unit 14 ends the customization end determination control process.

For example, the system control unit 14 periodically performs the customization end determination control process. In the control process performed from the update process of the number of operation times, the condition to end the change of the appearance is checked mainly from a viewpoint of the number of operation times. At this time, even if the number of operation times satisfies the condition to end the change of the appearance, an elapsed time from the last browsing date and time of the Q&A may not satisfy the condition to end the change of the appearance. Therefore, in the control which is periodically performed, the condition to end the change of the appearance is checked from a viewpoint of the elapsed time. At this time, the system control unit 14 selects one of the element records stored in the customization element information DB 12d. The system control unit 14 performs the customization end determination control process by assuming the display element ID stored in the selected element record to be the operation target display element ID. The system control unit 14 performs this process for all the element records stored in the customization element information DB 12d.

As described above, according to the embodiment, the system control unit 14 registers a history record that stores a Q&A-ID of a Q&A browsed by a user in the Q&A browsing history DB 12c, generates an HTML document so that an appearance of a display element, which is one of display elements included in a Web page displayed on the user terminal 2 used by a user, related to the Q&A indicated by the Q&A-ID stored in the registered history record is different from an appearance in the initial state on the basis of the definition records registered in the customization definition information DB 12b, and transmits the generated HTML document to the user terminal 2.

Therefore, it is easy for the user to find a display element related to a Q&A browsed by the user. Therefore, even when the user does not perform a setting operation of the appearances, it is possible to set the appearances of the display elements included in a Web page to be suitable for the user.

The system control unit 14 receives a user ID of a user who uses the user terminal 2 and a Q&A-ID of a Q&A included in a Web page transmitted to the user terminal 2 from the user terminal 2 and registers the received Q&A-ID and user ID in the Q&A browsing history DB 12c in association with each other.

Therefore, an operator of the site can know how the site should be improved from the information registered in the Q&A browsing history DB 12c.

The system control unit 14 acquires the number of operation times that a display element related to a Q&A is operated by a user after the Q&A is browsed from the customization element information DB 12d, determines whether or not the acquired number of operation times is greater than or equal to a threshold value of the number of operation times, and generates an HTML document so that an appearance of a display element of which the number of operation times is determined to be greater than or equal to the threshold value of the number of operation times is an appearance in the initial state.

Therefore, when a user operates a display element several times and the user gets used to the operation of the display element, the appearance of the display element need not be left changed. Thus, it is possible to prevent the display element from disturbing the user to find other display elements.

The system control unit 14 registers a history record including a Q&A-ID of a Q&A browsed by a user and a latest browsing date and time when the Q&A was browsed most recently by the user in the Q&A browsing history DB 12c, determines whether or not a time length indicated by a time threshold value has elapsed from the latest browsing date and time included in the registered history record, and generates an HTML document so that an appearance of a display element, where it is determined that the number of operation times is greater than or equal to the threshold value of the number of operation times and the time length indicated by the time threshold value has elapsed from the latest browsing date and time, is an appearance in the initial state.

Therefore, it is possible to reliably specify a display element whose appearance need not be left changed.

The system control unit 14 receives a Q&A-ID of a Q&A specified by a user to be displayed from the user terminal 2, receives a Q&A-ID of a Q&A displayed by the user terminal 2 together with a Q&A specified to be displayed from the user terminal 2 when a Q&A page is displayed by the user terminal 2, and registers a display element ID of a display element related to a Q&A indicated by the received Q&A-ID in the customization element information DB 12d in association with a degree of customization. At this time, the system control unit 14 sets the degree of customization of a display element related to a Q&A specified to be displayed to "high" and sets the degree of customization of a display element related to a Q&A that is not specified to be displayed to "low". The system control unit 14 generates an HTML document so that a difference between the appearance of the display element whose degree of customization is set to "high" and the appearance in the initial state is larger than a difference between the appearance of the display element whose degree of customization is set to "low" and the appearance in the initial state.

Therefore, it is possible to change an appearance of a display element related to a Q&A that may be browsed by a user from the appearance in the initial state and change the appearance to an appearance corresponding to the possibility that the Q&A is browsed.

The system control unit 14 generates an HTML document so that appearances of all display elements indicated by a display element ID stored in a definition record that stores a Q&A-ID stored in a history record registered in the Q&A browsing history DB 12c are different from the appearance in the initial state. When it is determined that the number of operation times of one of a plurality of display elements is greater than or equal to the threshold value of the number of operation times, the system control unit 14 determines whether the degree of inter-display-element association corresponding to a plurality of display elements is set to "strong" or "weak". When it is determined that the degree of inter-display-element association is set to "strong", the system control unit 14 generates an HTML document so that the appearances of all the plurality of display elements are the appearance in the initial state. When it is determined that the degree of inter-display-element association is set to "strong" "weak", the system control unit 14 generates an HTML document so that only the appearances of display elements whose number of operation times is determined to be greater than or equal to the threshold value of the number of operation times are the appearance in the initial state.

Therefore, it is possible to appropriately set the appearances of a plurality of display elements related to one Q&A.

In the embodiment described above, the system control unit 14 records the browsing history of Q&A and the customization element information in a database constructed in the storage unit 12 included in the service providing server 1. However, the system control unit 14 may record the browsing history of Q&A and the customization element information as cookies in the user terminal 2. Specifically, when the system control unit 14 receives a request of an HTML document of a Q&A page or a Q&A browsing history recording request, the system control unit 14 transmits a Q&A browsing history including a Q&A-ID of a browsed Q&A, a last browsing date and time and the number of browsing times as cookies to the user terminal 2 which is the transmission source of the request. The system control unit 14 also transmits the customization element information including a display element ID of a display element corresponding to a browsed Q&A, the number of operation times, the degree of customization and the customization simultaneous ending list as cookies to the user terminal 2 which is the transmission source of the request. Thereby, every time the system control unit 14 receives a request from the user terminal 2, the system control unit 14 can acquire the Q&A browsing history and the customization element information stored in the user terminal 2 as cookies. In this case, the system control unit 14 may perform the Q&A browsing history recording process, the HTML document customization process, the update process of the number of operation times, and the like on the basis of the information acquired from the user terminal 2.

In the embodiment described above, it is assumed that the display element whose appearance is changed from the appearance in the initial state is a display element that can be operated. However, the display element whose appearance is changed from the appearance in the initial state may be a display element that cannot be operated. For example, when a Q&A related to the delivery of the item for sale is browsed, the appearance of a text of the brief explanation of delivery of the item for sale and the appearance of the delivery explanation link 104 may be changed.

In the embodiment described above, the number of operation times of a display element and the elapsed time from the last browsing date and time of the Q&A are used as the condition to end the change of the appearance of the display element. However, only the number of operation times of a display element may be used as the condition to end the change of the appearance of the display element.

In the embodiment described above, regarding Q&As displayed on the screen of the user terminal 2, appearances of display elements related to Q&As that are not specified by the user to be displayed are also changed. However, only appearances of display elements related to Q&As that are specified by the user to be displayed may be changed.

The explanatory information of the present invention may also be applied to information other than Q&A. For example, the explanatory information of the present invention may also be applied to information related to services provided through a Web page, such as a help, a manual, a guidance, and a tutorial. For example, providing a Web application or some functions by using Web is also an example of providing services through a Web page.

REFERENCE SIGNS LIST

1 Service providing server
2 User terminal
11 Communication unit
12 Storage unit
12a Member information DB
12b Customization definition information DB
12c Q&A browsing history DB
12d Customization element information DB
13 Input/output interface
14 System control unit
14a CPU
14b ROM
14c RAM
15 System bus
NW Network
S Service providing system

The invention claimed is:
1. An information generation device that transmits a Web page to a terminal device, the information generation device comprising:

a first transmission unit that transmits a first Web page to the terminal device, the first Web page including a plurality of explanatory items related to a service provided through a Web page, the first Web page including a program for transmitting display explanatory information to the information generation device, the display explanatory information indicating one or more explanatory items, among the plurality of explanatory items, included in a part of the first Web page, the part having been actually displayed by the terminal device in the first web page;

a first recording control unit that, when one of a plurality of links indicating that the respective plurality of explanatory items are link destinations is selected by a user using the terminal device to display a part of the first web page, causes history information to be recorded in a recording unit, the displayed part including at least one explanatory item indicated as a link destination by the selected link among the plurality explanatory items, the history information indicating the explanatory item indicated as the link destination by the selected link;

a second recording control unit that receives the display explanatory information transmitted from the terminal device having executed the program and causes the received display explanatory information to be recorded as history information in the recording unit;

an acquisition unit that acquires association information from a storage unit storing the association information, the association information indicating an element in association with the explanatory item, the element indicated by the association information being associated with the explanatory item among elements included in a second Web page;

a generation unit that, on the basis of the acquired association information, generates the second Web page in which an appearance of the element associated with the explanatory item indicated by the history information among the elements included in the second Web page displayed on the terminal device is different from an appearance in an initial state; and a second transmission unit that transmits the generated second Web page to the terminal device.

2. The information generation device according to claim 1, wherein the first recording control unit receives user identification information identifying a user using a terminal device and explanation identification information identifying the explanatory item indicated as the link destination by the selected link from the terminal device, and causes the history information to be recorded, the history information including the received user identification information and the explanatory item, the second recording control unit receives the display explanatory information including the user identification information and the explanation identification information identifying the explanatory item included in the part displayed by the terminal device.

3. The information generation device according to claim 2, further comprising:

a number-of-times acquisition unit that acquires number-of-times information indicating number of times that the element corresponding to the explanatory item is operated by a user after the explanatory item is displayed; and a first determination unit that determines whether or not the number of times indicated by the acquired number-of-times information is greater than or equal to predetermined number of times, wherein the generation unit generates the second Web page in which the appearance of the element for which the number of times indicated by the acquired number-of-times information is determined to be greater than or equal to the predetermined number of times is the appearance in the initial state.

4. The information generation device according to claim 2, wherein the storage unit stores the association information indicating the element associated with each of the plurality of explanatory items, the information generation device further comprises a difference recording control unit that causes difference information indicating a difference between the appearance of each element associated with the explanatory item indicated by either of the history information caused to be recorded by the first recording control unit and the history information caused to recorded by the second recording control unit and the appearance in the initial state to be recorded, the difference recording control unit making the difference of the element associated with the explanatory item indicated by the history information caused to be recorded by the first recording control unit higher than the difference of the element associated with the explanatory item indicated by the history information caused to be recorded by the second recording control unit, and the generation unit generates the second Web page in which the higher the difference indicated by the difference information, the higher the difference of the appearance of the element from the appearance in the initial state.

5. The information generation device according to claim 1, further comprising:

a number-of-times acquisition unit that acquires number-of-times information indicating number of times that the element corresponding to the explanatory item is operated by a user after the explanatory item is displayed; and a first determination unit that determines whether or not the number of times indicated by the acquired number-of-times information is greater than or equal to predetermined number of times, wherein the generation unit generates the second Web page in which the appearance of the element for which the number of times indicated by the acquired number-of-times information is determined to be greater than or equal to the predetermined number of times is the appearance in the initial state.

6. The information generation device according to claim 5, wherein each of the first recording unit and second recording unit records the history information including the explanation identification information identifying the displayed explanatory item and time information indicating time when the explanatory item was browsed most recently, the number-of-times acquisition unit acquires the number-of-times information indicating the number of times that the element corresponding to the explanatory item is operated by a user after the explanatory item was displayed most recently, the information generation device further comprises a second determination unit that determines whether or not a period of time of a predetermined length has elapsed from time indicated by the time information included in the recorded history information, and the generation unit generates the second Web page in which the appearance of the element for which the number of times indicated by the acquired number-of-times information is determined to be greater than or equal to the predetermined number of times and the period of time of the predetermined length has elapsed from the time indicated by the time information included in the recorded history information is the appearance in the initial state.

7. The information generation device according to claim 6, wherein the storage unit stores the association information indicating the element associated with each of the plurality of explanatory items, the information generation device further comprises a difference recording control unit that causes difference information indicating a difference between the appearance of each element associated with the explanatory item indicated by either of the history information caused to be recorded by the first recording control unit and the history information caused to recorded by the second recording control unit and the appearance in the initial state to be recorded, the difference recording control unit making the difference of the element associated with the explanatory item indicated by the history information caused to be recorded by the first recording control unit higher than the difference of the element associated with the explanatory item indicated by the history information caused to be recorded by the second recording control unit, and the generation unit generates the second Web page in which the higher the difference indicated by the difference information, the higher the difference of the appearance of the element from the appearance in the initial state.

8. The information generation device according to claim 6, wherein the storage unit stores the association information indicating that a plurality of the elements are associated with one of the explanatory item, the association information including element association information indicating strength of association among a plurality of the elements, the generation unit generates the second Web page in which the appearances of all the elements associated with the explanatory item indicated by the recorded history information are different from the appearances in the initial state, the information generation device further comprises a third determination unit that determines whether the element association information corresponding to the plurality of elements indicates stronger or weaker when it is determined that the number of times that one of the plurality of elements is operated is greater than or equal to the predetermined number of times, and the generation unit generates the second Web page in which the appearances of the plurality of elements are the appearances in the initial state when it is determined that the element association information indicates that the association is stronger and generates the second Web page in which only the appearance of the element for which the number of times indicated by the number-of-times information is determined to be greater than or equal to the predetermined number of times are the appearance in the initial state when it is determined that the element association information indicates that the association is weaker.

9. The information generation device according to claim 5, wherein the storage unit stores the association information indicating that a plurality of the elements are associated with one of the explanatory items, the association information including element association information indicating strength of association among the plurality of the elements, the generation unit generates the second Web page in which the appearances of all the elements associated with the explanatory item indicated by the recorded history information are different from the appearances in the initial state, the information generation device further comprises a third determination unit that determines whether the element association information corresponding to the plurality of elements indicates stronger or weaker when it is determined that the number of times that one of the plurality of elements is operated is greater than or equal to the predetermined number of times, and the generation unit generates the second Web page in which the appearances of the plurality of elements are the appearances in the initial state when it is determined that the element association information indicates that the association is stronger and generates the second Web page in which only the appearance of the element for which the number of times indicated by the number-of-times information is determined to be greater than or equal to the predetermined number of times are the appearance in the initial state when it is determined that the element association information indicates that the association is weaker.

10. The information generation device according to claim 5, wherein the storage unit stores the association information indicating the element associated with each of the plurality of explanatory items, the information generation device further comprises a difference recording control unit that causes difference information indicating a difference between the appearance of each element associated with the explanatory item indicated by either of the history information caused to be recorded by the first recording control unit and the history information caused to recorded by the second recording control unit and the appearance in the initial state to be recorded, the difference recording control unit making the difference of the element associated with the explanatory item indicated by the history information caused to be recorded by the first recording control unit higher than the difference of the element associated with the explanatory item indicated by the history information caused to be recorded by the second recording control unit, and the generation unit generates the second Web page in which the higher the difference indicated by the difference information, the higher the difference of the appearance of the element from the appearance in the initial state.

11. The information generation device according to claim 1, wherein the storage unit stores the association information indicating the element associated with each of the plurality of explanatory items, the information generation device further comprises a difference recording control unit that causes difference information indicating a difference between the appearance of each element associated with the explanatory item indicated by either of the history information caused to be recorded by the first recording control unit and the history information caused to be recorded by the second recording control unit and the appearance in the initial state to be recorded, the difference recording control unit making the difference of the element associated with the explanatory item indicated by the history information caused to be recorded by the first recording control unit higher than the difference of the element associated with the explanatory item indicated by the history information caused to be recorded by the second recording control unit, and the generation unit generates the second Web page in which the higher the difference indicated by the difference information, the higher the difference of the appearance of the element from the appearance in the initial state.

12. The information generation device according to claim 1, wherein the history information includes the number of display of the explanatory item, the first recording control unit adds 1 to the number of display included in the history information, and the second recording control unit adds a value smaller than 1 to the number of display included in the history information.

13. An information generation method of an information generation device that transmits a Web page to a terminal device, the information generation method comprising:

a first transmission step of transmitting a first Web page to the terminal device, the first Web page including a plurality of explanatory items related to a service provided through a Web page, the first Web page including a program for transmitting display explanatory information to the information generation device, the display explanatory information indicating one or more explanatory items, among the plurality of explanatory items, included in a part of the first Web page, the part having been actually displayed by the terminal device in the first web page;

a first recording control step of, when one of a plurality of links indicating that the respective plurality of explanatory items are link destinations is selected by a user using the terminal device to display a part of the first web page, causing history information to be recorded in a recording unit, the displayed part including at least one explanatory item indicated as a link destination by the selected link among the plurality explanatory items, the history information indicating the explanatory item indicated as the link destination by the selected link;

a second recording control step of receiving the display explanatory information transmitted from the terminal device having executed the program and of causing the received display explanatory information to be recorded as history information in the recording unit;

an acquisition step of acquiring association information from a storage unit storing the association information, the association information indicating an element in association with the explanatory item, the element indicated by the association information being associated with the explanatory item among elements included in a second Web page;

a generation step of, on the basis of the acquired association information, generating the second Web page in which an appearance of the element associated with the explanatory item indicated by the history information among the elements included in the second Web page displayed on the terminal device is different from an appearance in an initial state; and a second transmission step of transmitting the generated second Web page to the terminal device.

14. A non-transitory recording medium in which an information generation program is computer-readably recorded, the information generation program causing a computer, which is included in an information generation device that transmits a Web page to a terminal device, to function as:

a first transmission unit that transmits a first Web page to the terminal device, the first Web page including a plurality of explanatory items related to a service provided through a Web page, the first Web page including a program for transmitting display explanatory information to the information generation device, the display explanatory information indicating one or more explanatory items, among the plurality of explanatory items, included in a part of the first Web page, the part having been actually displayed by the terminal device in the first web page;

a first recording control unit that, when one of a plurality of links indicating that the respective plurality of explanatory items are link destinations is selected by a user using the terminal device to display a part of the first web page, causes history information to be recorded in a recording unit, the displayed part including at least one explanatory item indicated as a link destination by the selected link among the plurality of explanatory items, the history information indicating the explanatory item indicated as the link destination by the selected link;

a second recording control unit that receives the display explanatory information transmitted from the terminal device having executed the program and causes the received display explanatory information to be recorded as history information in the recording unit;

an acquisition unit that acquires association information from a storage unit storing the association information, the association information indicating an element in association with the explanatory item, the element indicated by the association information being associated with the explanatory item among elements included in a second Web page;

a generation unit that, on the basis of the acquired association information, generates the second Web page in which an appearance of the element associated with the explanatory item indicated by the history information among the elements included in the second Web page displayed on the terminal device is different from an appearance in an initial state; and a second transmission unit that transmits the generated second Web page to the terminal device.

* * * * *